United States Patent [19]
Ehrat

[11] 3,836,755
[45] Sept. 17, 1974

[54] SELF-SERVICE SHOP

[75] Inventor: Kurt Ehrat, Zurich, Switzerland

[73] Assignee: Gretag Aktiengesellschaft, Regensdorf, Switzerland

[22] Filed: Feb. 12, 1973

[21] Appl. No.: 331,884

[30] Foreign Application Priority Data
Feb. 14, 1972 Switzerland.......................... 2087/72

[52] U.S. Cl. ...... 235/61.7 R, 186/1 AC, 340/149 R
[51] Int. Cl. ........................ G06k 7/00, G06k 15/00
[58] Field of Search ........ 186/1 A, 1 AC; 235/91 L, 235/61.9 R, 61.7 R, 61.6 R; 340/149 R, 153

[56] References Cited
UNITED STATES PATENTS

| | | | |
|---|---|---|---|
| 2,919,851 | 1/1960 | Otis | 235/61.9 R |
| 3,340,509 | 9/1967 | Krause | 340/149 R |
| 3,426,326 | 2/1969 | Goldstein | 340/153 |

*Primary Examiner*—Thomas A. Robinson
*Attorney, Agent, or Firm*—Pierce, Scheffler & Parker

[57] ABSTRACT

Equipment for a self-service shop having a check-out station for determining sales data from machine readable data relating to the type of article and its weight applied to articles purchased by a customer; the equipment comprising a container in which the customer places the articles that he wishes to purchase, the container including means for reading the data applied to each article as it is placed in or removed from the container, and weighing means for indicating the increase and decrease in weight of the container resulting from placing or removing an article therein. The equipment also includes a system for evaluating the data read by the reading means and the weight indication to determine whether the purchased article has been put in or removed from the container and the data correctly read, a signalling system being provided to indicate if either the article data has been correctly read but the article has not been put in or removed from the container or the correct weight has been indicated but the data has not been correctly read. The evaluation system may be in the container or in the check-out station in which case communication between it and the container is by radio.

16 Claims, 30 Drawing Figures

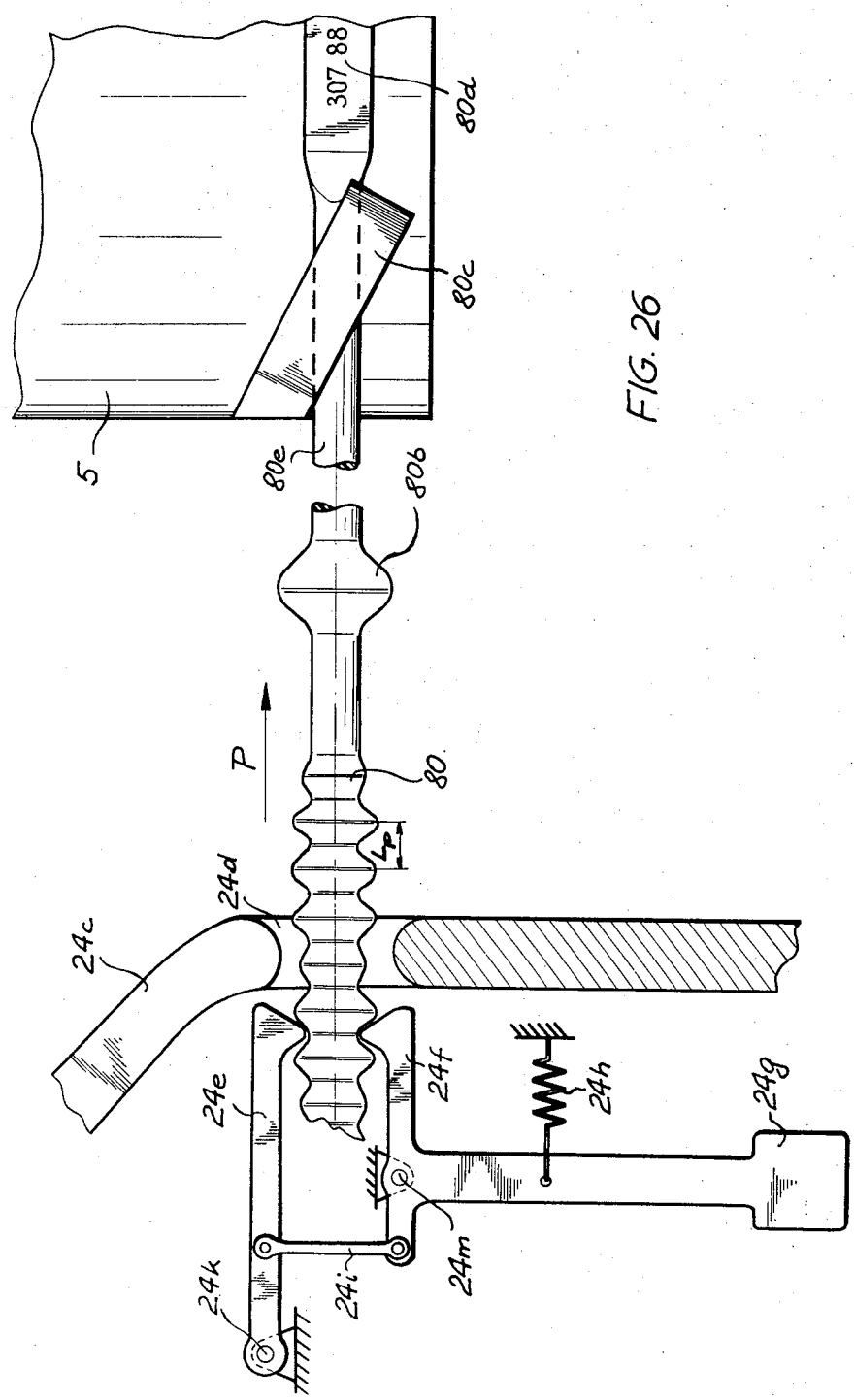

SELF-SERVICE SHOP

FIELD OF THE INVENTION

This invention relates to equipment for a self-service shop in which identifying data are printed on the goods or a label carrying such data is affixed thereto, the data containing at least the article designation in machine-readable form. Trolleys are provided, each of which has a container in which the purchaser stacks the goods during the purchasing operation. Sales data from the article designations are read out from the goods stacked in the trolleys to provide an indication and/or print-out of the prices and/or of the price total of the goods purchased by the purchaser at a check-out station which has a computer associated therewith or contained therein for automatically determining the aforementioned sales data.

PRIOR ART

In equipment of this kind in which the check-out station is directly associated with the computer, the data affixed to the underside of the goods are machine-read in the check-out station. To this end the station is provided with a reading device and a conveyor belt associated therewith. At the check-out station, the purchaser or a shop assistant must remove the purchased goods piece by piece from the purchasing container, place them on the conveyor belt and subsequently return them into a container for the purpose of article identification and evaluation. While each article passes through the reading device the latter scans the data on the underside of the article. This system suffers from the disadvantage that it is not able to shorten or even avoid the disturbing queues at the check-out station because it requires the time-consuming procedure of re-loading the articles from the purchasing container to the conveyor belt and vice versa. Since only one article at a time is allowed to pass the reading device in this system to avoid fraudulent manipulation by stacking one article on top of another, the sequential passage of individual articles through the reading device results in a further delay in each customer passing through the check-out station.

BRIEF DESCRIPTION OF THE INVENTION

This invention seeks to avoid these disadvantages by using trolleys which have a container forming the weighing pan of weight difference scales, disposed in the purchasing trolley, the scales being adapted to define the increase in weight of the container resulting from the placing therein of an article or the reduction of weight resulting from the removal of an article. Each of the purchasing trolleys is also provided with a reading device for machine-reading the data on each article to determine the article designation. The weight difference scales and the reading device are connected to evaluating means which actuate a signalling device disposed in the purchasing trolley if reading of a correct and complete article designation is not accompanied by a measured weight increase with loading the trolley or a weight reduction when unloading the trolley and reading the correct and complete article designation.

Article identification when loading the trolley does not take place at the check-out point but during the purchasing operation when each article is placed by the purchaser into the purchasing trolley so that it is merely necessary for the sales data to be checked at the check-out station on the basis of the article designations which have already been read during purchasing.

A first preferred embodiment of the system according to the invention is characterised in that the data additionally includes article weight data in machine-readable form, the reading device being provided with means for reading the aforementioned article weight data which is stored in an intermediate weight store. The evaluating device contains a comparator for comparing the read-off article weight data which is stored in the intermediate weight store with the measured value of the weight and the signalling device contains a first stage which responds when the deviation between measured weight and article weight data as defined by the comparator exceeds a specific tolerance value. This embodiment has the advantage that the weight of each article is measured and monitored when each article is read-in so that fraudulent manipulations are substantially eliminated.

BRIEF DESCRIPTION OF DRAWINGS

Portable devices instead of purchasing trolleys may be used for transporting the goods selected by the purchaser.

A preferred embodiment of the invention will now be explained hereinbelow with reference to the accompanying drawings in which, FIGS. 9 and 10 are waveforms resulting from the scanning of data.

DETAILED DESCRIPTION OF PREFERRED EMBODIMENTS

Figure 1:
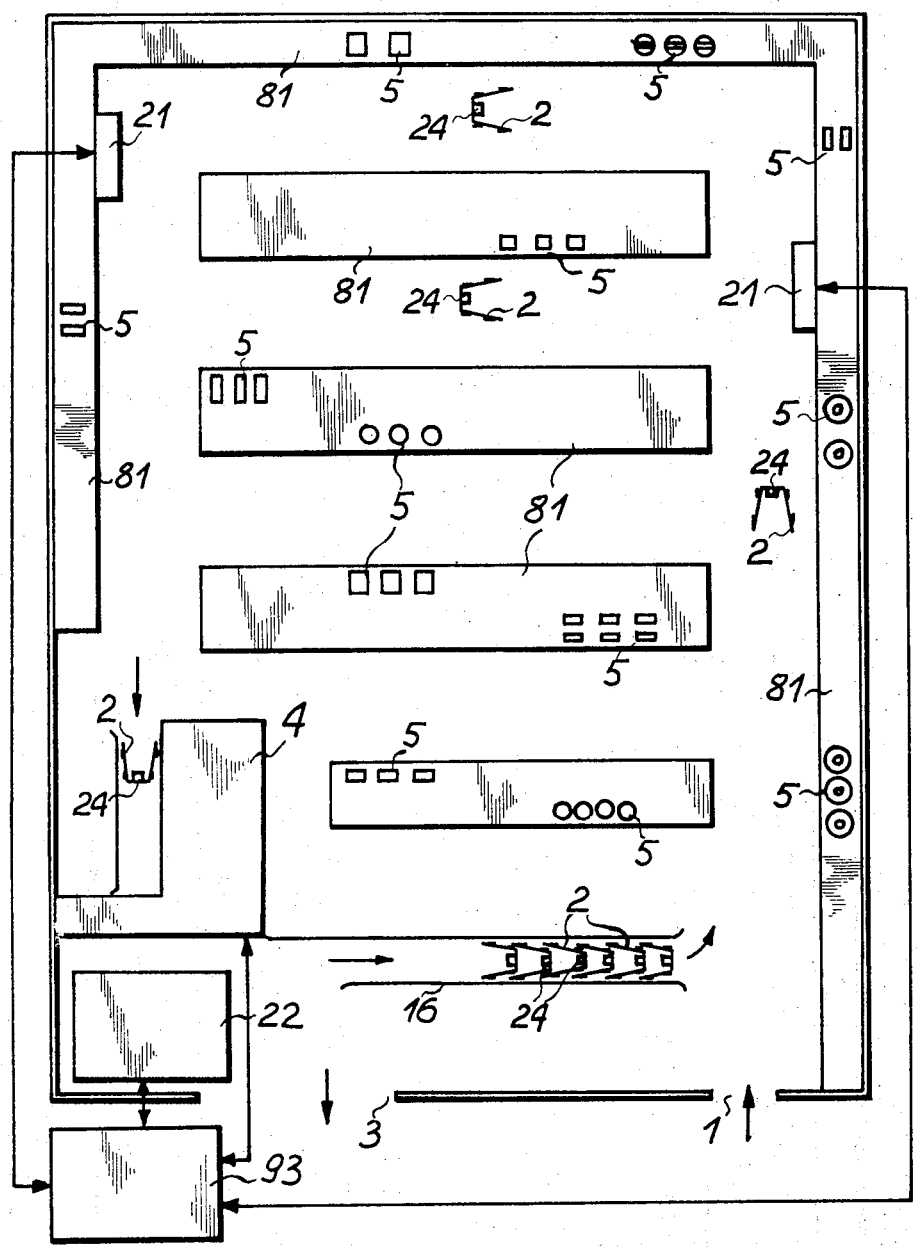
FIG. 1 is a diagrammatic view of a self-service shop.

FIG. 1 shows a diagrammatic plan view of a self-service shop with an entrance 1 and an exit 3, goods shelves 81 on which articles 5 are placed ready for sale, purchasing trolleys 2 provided with reading means 24, a check-out station 4, test stations 21, a trolley park 16 for the purchasing trolleys, a spot check station 22 and a computer 93 associated with the spot check station 22, the check-out station 4 and the test stations 21.

Figure 2:
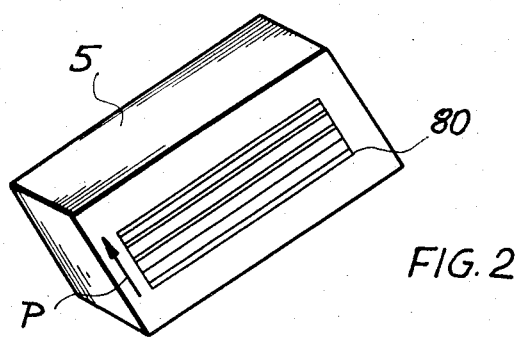
FIGS. 2, 3 and 4 show articles having identifying data either printed thereon or on a label which is affixed to the article.
Figure 3:
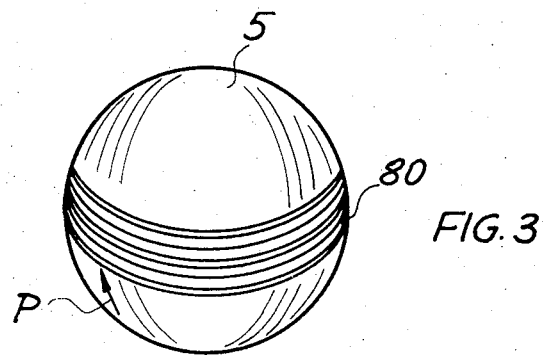
Figure 4:
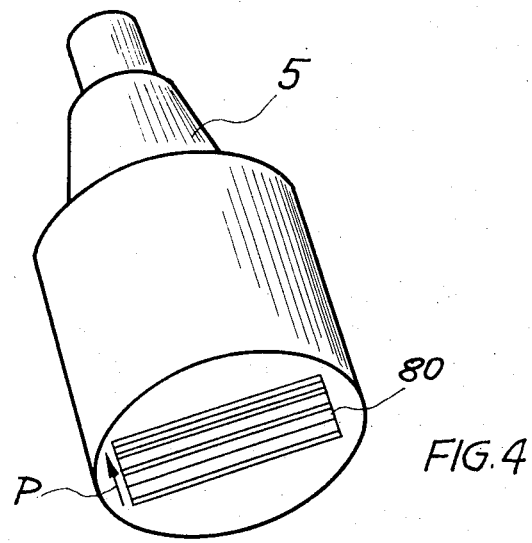

FIG. 2 to 4 show different kinds of articles 5, each article having data printed thereon or on a data support 80 adhesively affixed to the article. The data includes at least the article designation, for example the article number, in a form which may be scanned by machine, preferably photoelectrically, and the data may also contain the article weight. Before a customer places an article into his purchasing trolley he guides the data support 80 on the article approximately in the direction of the arrow P past the reading means 24 (FIGS. 1 and 5) which are mounted on his purchasing trolley 2 (FIG. 1) during which process the data on the data support is automatically read out.

Figure 5:
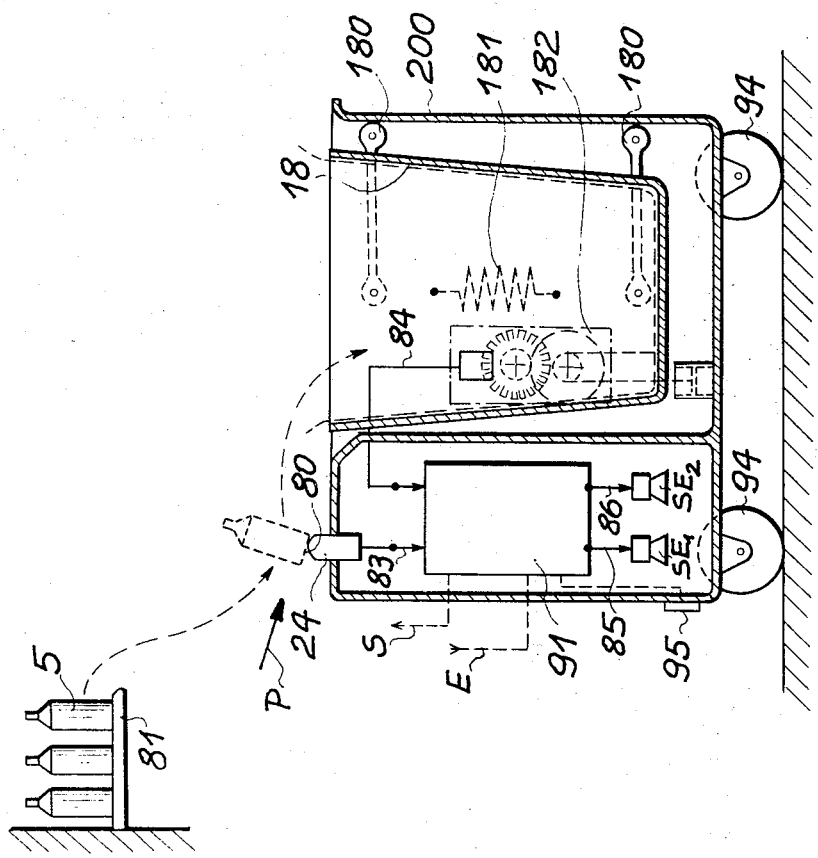
FIG. 5 shows a purchasing trolley as used in the self-service shop.

As shown in FIG. 5, which is a longitudinal section through a purchasing trolley 2, the trolley includes an outer frame 200 having a base provided with wheels 94, a goods basket 18 pivotally supported in the outer frame by means of arms 180 spring biased in the vertical direction by a tension spring 181, reading means 24 and the so-called purchasing container electronic system 91. The purchasing trolleys are constructed so as to be stackable in known manner. The goods basket 18 forms a weighing pan of scales 182 which are incorporated in the purchasing trolley. The scales are provided at least for detecting any weight increase of the goods basket 18 when an article is placed therein or to detect a weight reduction when an article is removed from the goods basket but is used mainly for the exact measurement of the appropriate increase or decrease of the weight when articles are placed into or removed from the basket. As already mentioned, the reading device is provided for machine-reading the data on the data supports 80 (FIG. 4) attached to the individual articles. The reading means 24 are connected via a conductor 83 to the purchasing container electronic system 91. The scales 182 are also connected via a conductor 84 to the purchasing container electronic system, at least one signal indicating a weight increase or whether the weight of each article placed in the purchasing basket has been fed into the purchasing container electronic system 91. The purchaser container electronic system 91 has three outputs, an output 85 which is connected to a signalling system $SE_1$, an output 86 which is connected to a further signalling system $SE_2$ and an output 95 for off-line operation to which a plug may be connected or a transmitter output S for on-line operation. The purchasing container electronic system for on-line operation also contains a receiver input E.

The method of operation of the purchasing trolley is as follows: the customer takes an article 5 from its shelf 81, the article being provided for example on its underside with the data support 80, guides the article so that the data support 80 bears upon the reading means 24 in the direction of the arrow P and thereafter places the article in the goods basket 18. The reading device 24 reads the data on the data support 80 and feeds such data via the conductor 83 into the purchasing container electronic system 91. When the article 5 is placed into the goods basket 18 the scales 182 are actuated and the measured weight of the article or a signal which indicates a weight increase of the goods basket is fed via the conductor 84 into the purchasing container electronic system 91. A check is made in the purchasing container electronic system 91 to determine whether the data of the data support 80 were correctly read and whether the weight increase measured by the scales 182 coincides within specific limits with the weight data on the data support or whether placing the article into the goods basket 18 was accompanied by a weight increase.

If there is a faulty reading of the data on the data support, an alarm signal is triggered via the output 85 and the signalling system $SE_1$. In this case the customer removes the article from the goods basket and once again guides it past the reading means 24. Fault recognition is made possible by a fault recognising redundant security code of known kind. The security code need normally only be employed if the data are read by photoelectric means. For example, if the data are mechanically scannable reading will be substantially more reliable and the security code and the signalling system $SE_1$ may be omitted. The redundant security code performs substantially two functions: firstly it detects faulty, dirty or damaged data and causes the purchaser to once again attempt the reading operation by repositioning the data support relative to the reading device 24 or purchase an article with a clean undamaged data support. Secondly, the security code functions to recognise articles incorrectly designated; only correctly designated articles are admitted.

An alarm signal is triggered via the output 86 and the signalling means $SE_2$, if the weight increase measured by the scales 182 does not correspond to the weight data on the data support or if placing the article into the goods basket is not accompanied by a weight increase. An alarm signal may also be triggered if the scales 182 record a change of weight but the reading means 24 do not feed data from the appropriate data support into th purchasing container electronic system and vice versa. The signalling system $SE_2$ therefore triggers an alarm signal for example if the customer has omitted to pass an article over the reading means. In this case, the customer must remove the article from the goods basket and guide it past the reading means. Preferably the alarm signal continues until the customer removes that article or at least an article of the same weight from the goods basket.

Figure 6:
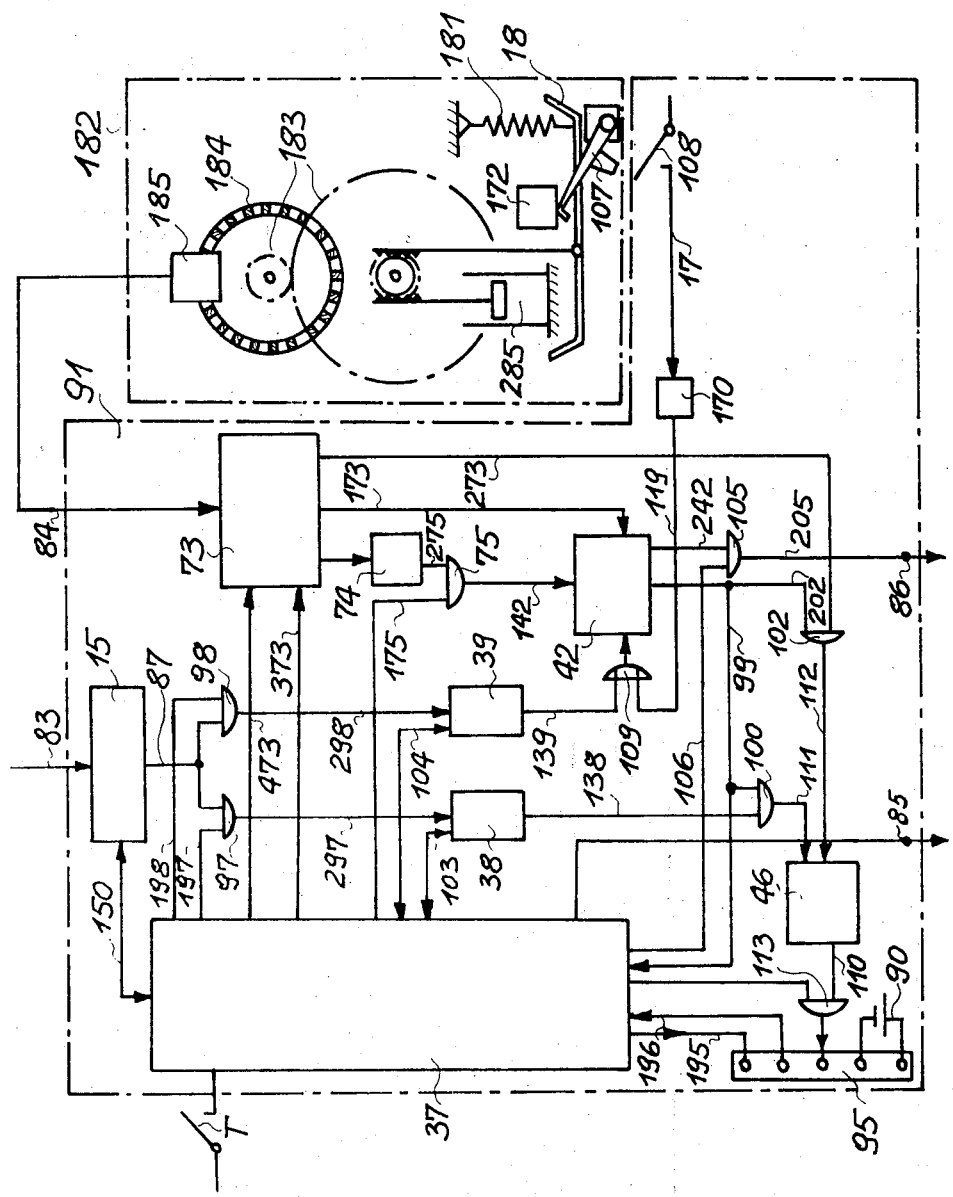
FIG. 6 is a block diagram of an electronic system associated with or in the purchasing trolley shown in FIG. 5.

FIG. 6 shows the purchasing container electronic system 91 of a purchasing trolley 2 equipped for "off-line" operation and weight measurement as a block circuit diagram, the associated scales being shown in diagrammatic form.

The purchasing container electronic system 91 comprises an electronic evaluation unit 15 into which the conductor 83 (FIG. 5) passes and which is connected via a conductor 150 to an electronic control system 37 and via a conductor 87 to two AND networks 97 and 98. The two AND networks are also connected through conductors 197 and 198 respectively to the electronic control system 37. The output of the AND network 97 is connected via a conductor 297 to an intermediate article store 38 and the output of the AND network 98 is connected via a conductor 298 to an intermediate weight store 39. Each of the two stores have a second input: the second input of the intermediate article store 38 is connected via a conductor 103 and the second input of the intermediate weight store 39 is connected via a conductor 104 to the electronic control system. The output of the intermediate article store 38 is connected via a conductor 138 to an AND network whose second input is connected via a conductor 99 to the electronic control system 37 and whose output is connected via a conductor 111 to one input of an article designation store 46. The second input of the article designation store 46 is connected to the output of an AND network 102. The output of the article designation store 46 is connected via a conductor 110 to one input of an AND network 113 whose other input is connected to the electronic control system 37 and whose output is connected to the purchasing container electronic system output 95. The output 95 is also connected via two conductors 195 and 196 to the electronic control system 37 and two terminals are connected to a current source 90. The output of the intermediate weight store 39 is connected via a conductor 139 to one input of the OR network 109 whose other input is connected via a conductor 119 to a check weighing stage 170, the output of the aforementioned OR network being connected to the first input of a comparator 42. The second input of the comparator 42 is connected via a conductor 142 to the output of an AND network 75. One input of the AND network 75 is connected via a conductor 175 to the electronic control system 37, the other input being connected via a conductor 275 and a motion detector 74 to the first output of a scales counter 73. The second output of the scales counter 73 is connected via a conductor 173 to the third input of the comparator 42 and the third output of the scales counter 73 is connected via a conductor 273 to one input of the AND network 102 whose input is connected via a conductor 202 to one ouptut of the comparator 42 and to the conductor 99. The other output of the comparator 42 is connected via a conductor 242 to one input of an AND gate 105 whose other input is connected via a conductor 106 to the electronic control system 37 and whose output is connected via a conductor 205 to the purchasing container electronic output 86. The purchasing container electronic output 86 is connected to the electronic control system 37. The scales counter 73 is provided with three inputs. Two inputs are connected via conductors 373 and 473 to the electronic control system 37, the third input being connected to the conductor 84 (FIG. 5). The electronic control system 37 also has a manually actuated key T.

The scales 182 (FIG. 5) comprise a transmission system 183 with a damping system 285 and a scale 184. The scale is preferably constructed of polyester material and its circumference is provided with equally spaced marks, for example alternately applied transparent lines which are scanned by a photoelectric reading head 185. The output of the reading head 185 is connected to the conductor 84. A check weight 172 is normally locked in a position relative to the goods basket 18 so that it does not act on the goods basket 18. On being unlocked the weight 172 moves down to close a switch 108 by means of a pivotably supported lever 107 mounted near the goods basket 18 which forms a scale pan. The check weighing stage 170 is therefore provided via a conductor 17 with a signal which corresponds to a preset check weight.

The method of operation of the scales 182 illustrated in FIG. 6 and of the purchasing container electronic system 91 is as follows: when the reading means 24 (FIG. 5) read the data on the data support 80 of an article 5 (FIG. 4) selected by the customer, the data which is thus read off is passed via the conductor 83 into the electronic evaluation unit 15 where an unequivocal digital binary pulse sequence is produced, for example by regeneration, from the data which has been read in. Th binary pulse sequence is divided by the electronic control system 37 and the AND networks 97 and 98 into the article designation, network 97, and the article weight data, network 98. The article designation passes from the AND network 97 into the intermediate article store 38, the weight data passes from the AND network 98 into the intermediate weight store 39 where it is stored. When using data supports with an error recognising security code the electronic control system 37 will inter alia incorporate an error recognition circuit which checks the data stored in the stores 38 and 39 for the presence of errors. If an error is recognised a signal will be supplied to the signalling system $SE_1$ (FIG. 5) via the conductor 85 thus triggering an alarm. When the signal is transmitted to the signalling system $SE_1$ the data in the stores 38 and 39 is cancelled via the conductors 103 and 104 and the customer must again guide the article past the reading means 24 for renewed scanning of the data support 80 (FIG. 4). However, if the data stored in the stores 38 and 39 is evaluated as error-free they will remain stored for further processing. Following the procedure of reading the data of the data support by the reading means 24 (FIG. 5), the article is placed into the goods basket 18. The goods basket on being loaded with the weight of the article causes the transmission system 183 to produce a rotary motion of the scale 184, the reading head 185 thus detects a sequence of alternating bright and dark lines so that an electric pulse sequence is produced at the output of the reading head, the pulse sequence being supplied via the conductor 84 to the scales counter 73. The scales counter 73, constructed so that it may count in the forward and reverse direction, counts the number of scale marks which have passed by the reading head 185 during the rotary motion of the scale 184. The number of marks scanned is therefore a measure of the weight of the article placed into the goods basket 18. Before placing a fresh article into the basket the scales counter 73 is set to zero by the electronic control system 73 via the conductor 473 and counts from zero when an article is placed into the basket so that the counter-position is unequivocally co-ordinated with the weight of the article. The motion detector 74 being responsive to the output signal from the scales counter 73 determines when the purchasing basket 18 and therefore the scales 182 are once again at rest after an article has been placed therein. When this is the case the motion detector 54 produces a signal which switches on the comparator 42 via the conductor 275, the AND network 75 and the conductor 142. This switching-on operation is controlled by the electronic control system 37 via the conductor 175 so that the comparator 42 becomes operative only when the scales 182 are operated, that is to say after an article has been placed into the goods basket.

The comparator 42 compres the article weight data stored in the intermediate weight store 39 with the article weight stored in the scales counter 73. If both weight values, i.e. the weight which has been read off and the weight which has been measured, are equal or if the deviation between the two weight values is within a predefined tolerance range, an output signal from the comparator is passed to the line 99 to cause the electronic control system 37, to transfer the article designation read out from the intermediate article store 38 into the article designation store 46, the signal on line 99 also energising the AND gate 100. Further counting of the scales counter 73 produces a signal characterising the "weight increase" criterion which is marked with a positive sign. This "+" mark is fed via the conductor 273 and the AND network 102, also energised by the signal on line 99 via line 202, into the article designation store 46 and is co-ordinated therein with the appropriate article deisgnation. The intermediate stores 38 and 39 are subsequently cancelled via the electronic control system 37 and the conductors 103 and 104, and the scales counter 73 is set to zero via the conductor 473. If the comparator 42 does not record coincidence between the weight which has been read off and the weight which has been measured, the signalling system $SE_2$ is triggered from the comparator output via the conductor 242, the AND network 105 and the conductor 205 (output 86). When an article is removed from the goods basket it must be guided past the reading means 24 in the same way as when it is placed into the basket (FIG. 5). The article designation with the article weight is therefore once again read off. The read-off article weight is compared in the compartor 42 with the measured weight reduction. If coincidence is obtained the read-in article designation is transferred into the article designation store 46. Reverse counting of the scales counter 73 produces a signal which characterises the "weight reduction" criterion in the counter, this being marked with a negative sign. This "—" mark is fed into the article designation store 46 and is coordinated therein with the appropriate article designation.

If an article is returned to the shelves instead of being placed into the goods basket after having been read in, the signalling system $SE_2$ will be triggered due to non-coincidence between the read-off and measured article weight. The alarm signal transmitted by the signalling system is shut off via the electronic control system 37, the conductor 106 and the AND network 105 by operating the key T. Operation of the key T also cancels the intermediate stores 38 and 39 via the electronic control system 37 and the conductors 103 and 104.

When a purchasing trolley passes by the check-out station 4 (FIG. 1), loading the goods basket with the monitoring weight 172 automatically tests to see if movement of the scales 182 (FIG. 5) is being blocked. Loading the goods basket with the monitoring weight 172 must result in the scales indicating a measured value which corresponds to the weight of the monitoring weight. This measured value is stored in the stage 170. When the goods basket is loaded with the monitoring weight 172, it closes the switch 108 via the lever 107 and the comparator 42 is fed via the conductor 119 and the OR network 109 with the measured value which is stored in the stage 170. If the scales 182 are prevented from moving, the comparator 42 will trigger the signalling system $SE_2$. This monitoring operation prevents misuse of the scales by restricting or preventing their movement, and therefore the goods basket to avoid the purchased goods being accounted for. At the end of the purchasing operation all article designations of the purchasing operation together with their "+" or "—" marks are transferred to the check-out station or the computer 93 (FIG. 1) by a control instruction transmitted by the check-out station via the conductor 110, the AND network 113 and the output 95. The current source 90 supplies the current required for operating the purchasing container electronic system 91 and may be recharged via a plug which is connectable to the terminal 95 when the purchasing trolley is placed into the trolley park 16 (FIG. 1).

Figure 7:
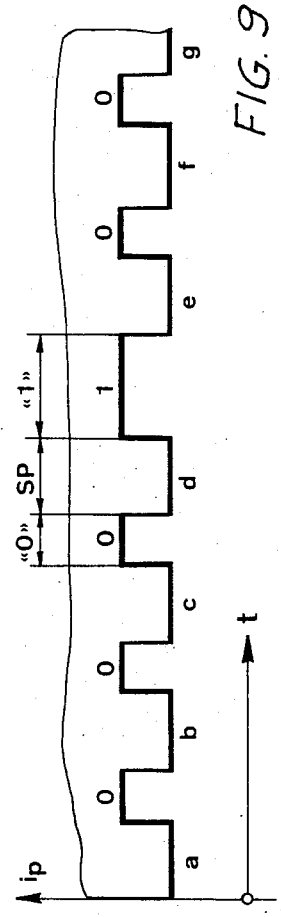
FIG. 7 is a diagrammatic view of data printed on an article or on a label or other form of data support.

As shown in FIG. 7 the data contained in binary form on a data support 80 (FIG. 4) comprises three groups: the first data group designated AB has 17 binary symbols to represent the article designation, the second data group designated AG has 10 binary symbols to represent the article weight and the third data group designated SZ comprises 8 redundancy bits for error recognition. The binary symbols "0" and "1" may be presented on the data support zone in the following manner: either the binary symbol "0" as a narrow white line between two black lines and the binary symbol "1" as a broad white line between the two black lines for photoelectric scanning, or the binary symbol "0" as a shallow protuberance between two grooves or a perforation for mechanical scanning and the binary symbol "1" as no perforation of a data support zone in the manner of a punched strip for mechanical scanning, or the binary symbols "0" and "1" as oppositely magnetised polarisations for magnetic scanning.

Figure 8:
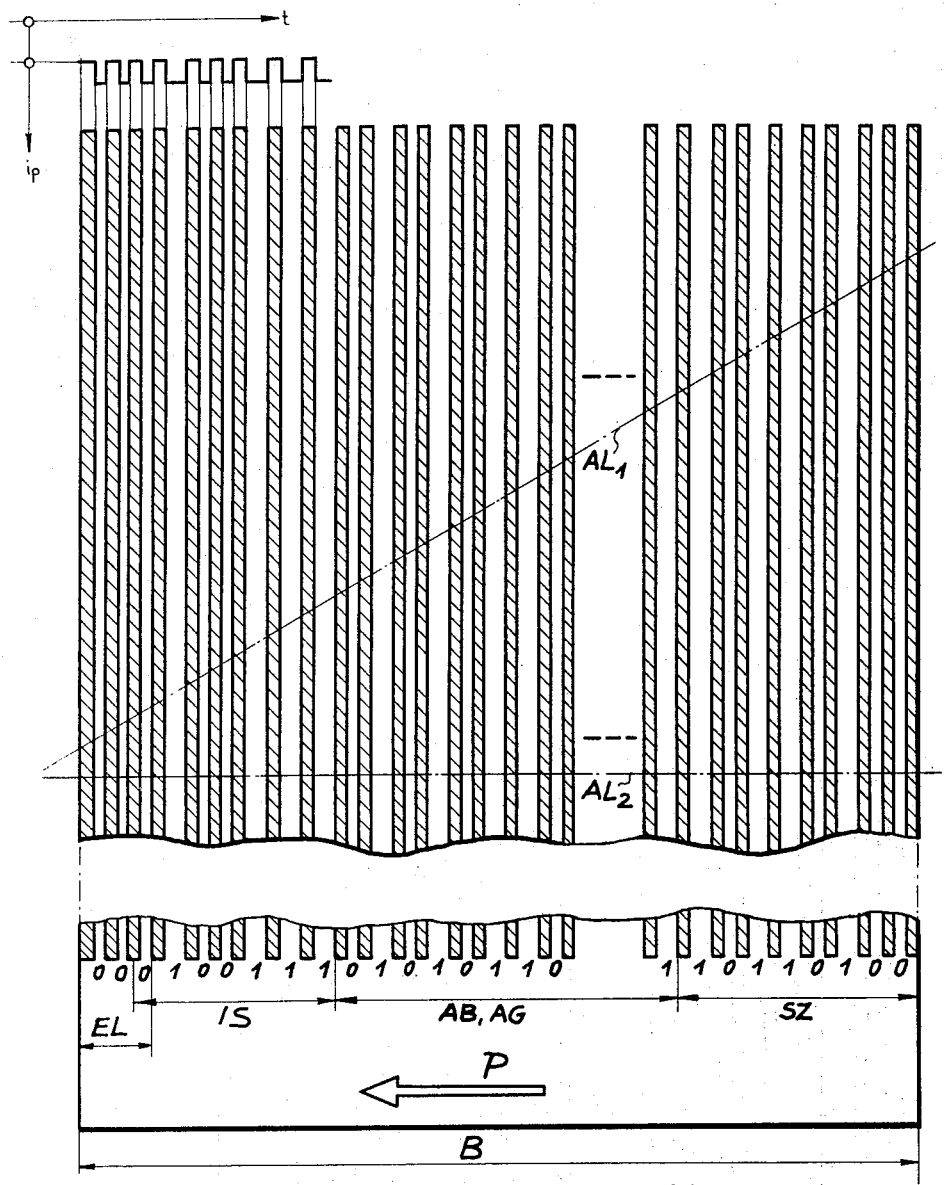
FIG. 8 is an enlarged view of a data support which may be scanned by photoelectronic means.
Figure 10:
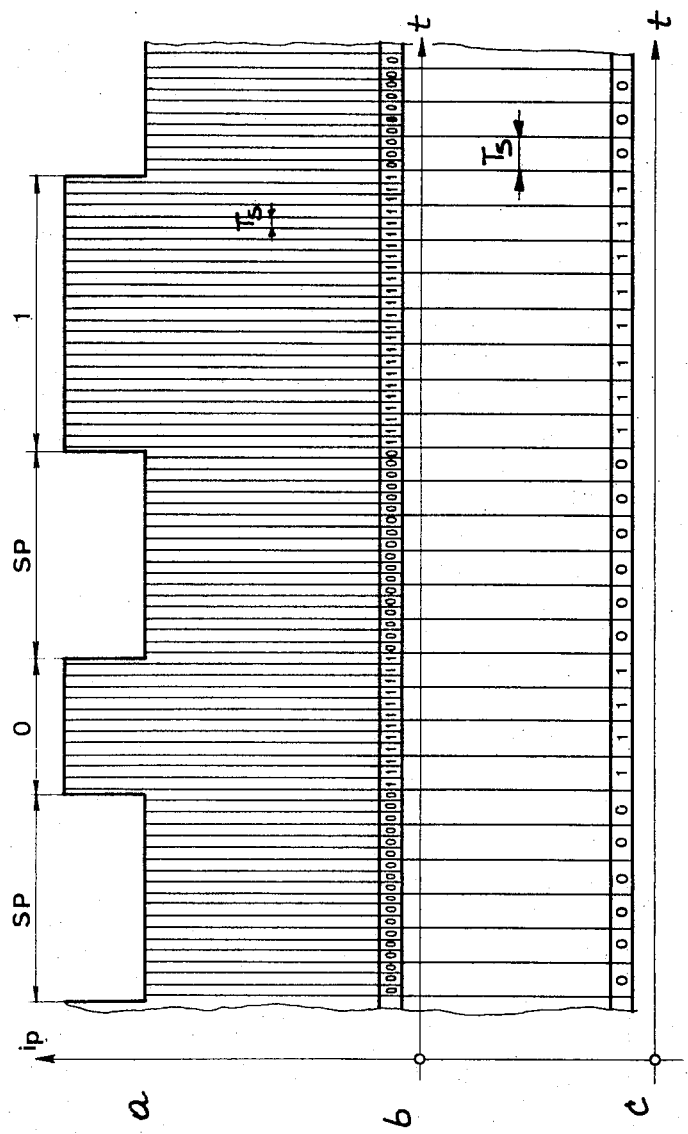
Figure 11:
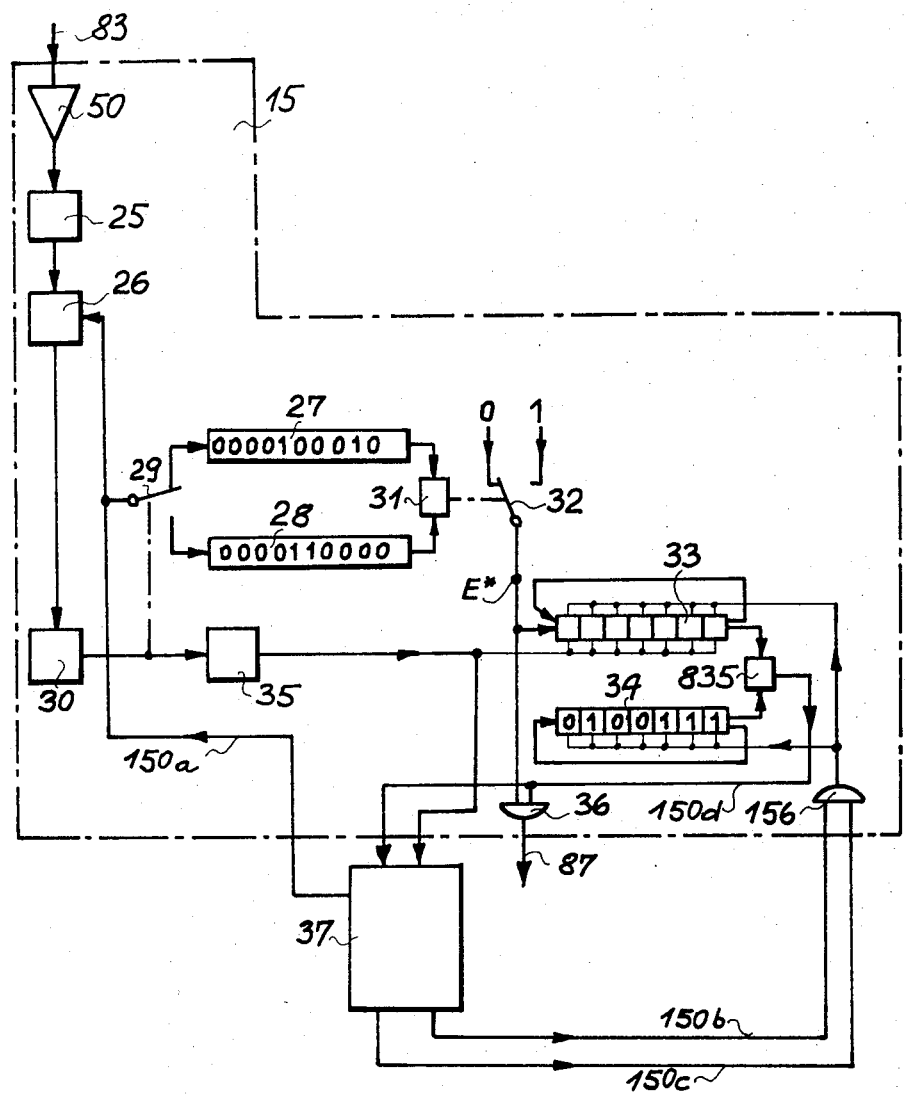
FIG. 11 is a circuit diagram of the evaluating means of the electronic system illustrated in FIG. 6.

FIG. 8 is an approximately 10 times magnification of a data support 80 which may be photoelectrically scanned, FIG. 9 shows an enlarged section of a part of a waveform derived from photoelectrically scanning the data support 80 shown in FIG. 8, FIG. 10 shows an enlarged section of the waveform shown in FIG. 9 and FIG. 11 shows the electronic evaluation system 15 for evaluating the data read off a data support.

As shown in FIG. 8 the entire article data, that is to say the article designation AB and the article weight information AG is represented on the data support 80 in the form of white and black lines. These marks may form part of the packaging or may be applied subsequently thereto or onto the article, for example by adhesive fixing. The lines may cover the entire width of the underside of the article and scanning is performed transversely to the lines in the direction of the arrow P. The width B of the data support 80 (which is transverse to the width of the article) amounts to approximately 1½ to 2 cm. The binary encoded article data is contained in the width of the white lines each of which is disposed between two black lines. A narrow white line corresponds to the binary symbol "0." The width of the black line is greater than that of the binary symbol "0" and less than the width of the white line representing the binary symbol "1." Photoelectric scanning which proceeds in the opposite direction to the arrow P provides the pulse sequence shown at the left-hand top of FIG. 8 — a short pulse of photoelectric current $i_p$ corresponds to the binary symbol "0" a long pulse of photoelectric current $i_p$ corresponding to the binary symbol "1."

The beginning of the article data must be reliably recognisable by the reading operation. Drawings or inscriptions and the like applied to the article must not interfere with the reading operation. The following "run-in data" is therefore applied to the run-in side of the data support upstream of the actual article data:

run-in EL comprising 3 successive "0,"
pulse template IS comprising a sequence of 7 pulses, namely:
0 1 0 0 1 1 1.

The three binary symbols "0" of the run-in are to define the photoelectric current limiting value readings above which are to be evaluated as "1" and those below which are to be evaluated as "0."

The purpose of the pulse template IS is to define precisely the beginning of the article data to within one bit. Basically this is achieved by storing seven successive bits during scanning and correlating the seven stored bits with a correlation template, also representing 0100111 whenever a new bit is read. The correlation value 7 will be obtained if the phase is correct while a correlation value of −1 occurs in all other phases. This defines the beginning of the article data.

FIG. 9 shows part of the photoelectric current $i_p$ plotted against time $t$ of the pulse sequence shown at the top left-hand of FIG. 8. The pulses produced by scanning the black lines on the data support are marked with the letters $a$, $b$, $c$, $d$, $e$, $f$, and $g$, and the pulses produced by scanning the white lines are marked with the data values 0 or 1. The width of the binary "0" pulses is equal to 1, for a space SP (black line) it is equal to 1.5 and for binary symbol "1" it is equal to 2.

FIG. 10 shows at $a$ an enlarged section of the pulse sequence illustrated in FIG. 9 which is produced when the data on a data support 80 is scanned along the line $AL_1$ or $AL_2$ shown in FIG. 8. The photoelectric current $i_p$ produced as a result of scanning is amplified and scanned with a sampling frequency having a sampling cycle $T_S$. If the data support is guided slowly past the reading means 24 (FIG. 5) by hand a large number of scanning values will be obtained for each line of data. If the data support is guided rapidly past the reading means a smaller number of scanning values will be obtained for each line of data. Line $b$ of FIG. 10 shows the formation of samples obtained when the data support is guided slowly past the reading means while line $c$ shows a sample formation obtained when the data support is guided three times as rapidly as in line $b$. Along line $b$, the space SP comprises 18 scanning values "0," the binary symbol "0" comprises 12 scanning values "1," and the binary symbol "1" comprises 24 scanning values "1." According to line $c$ the space SP comprises 6 scanning values "0," the binary symbol "0" comprises 4 scanning values "1" and the binary symbol "1" comprises 8 scanning values "1." The sampling frequency cycle $T_S$ is always constant but the speed with which the data support is guided past the reading means 24 (FIG. 5) is variable. This sampling method permits differentiation between binary "0" values and binary "1" values even if the speed of guiding the article past the reading means varies widely. First the "0" samples are counted and subsequently the "1" samples of the succeeding data bit are counted. If the number of "1" samples is less than the number of "0" samples the data is evaluated as "0" but if it is larger the data is evaluated as "1." Referred to line $b$ this means: the first data bit is evaluated as "0" (since 12 < 18) and the second data bit is evaluated as "1" (since 24 > 18). Using this evaluation rule the data evaluation is the same for line $c$ which is the result of scanning three times as fast as that producing line $b$.

According to FIG. 11 which shows the construction of the electronic evaluation system 15, the conductor 83 is connected to the input of the amplifier 50 whose output is connected to the input of a threshold detector 25. The output of the threshold detector 25 is connected to one input of a sampling stage 26 whose other input is connected via a conductor 150$a$ to the electronic control system 37 (FIG. 6). The conductor 150$a$ by means of which the sampling cycle $T_S$ (FIG. 10) is transmitted is also connected to a selector switch 29 which may be connected to a first counter 27 or to a second counter 28. The output of the sampling stage 26 is connected to a detector 30 which drives the selector switch 29. The outputs of the two counters 27 and 28 are connected to a comparator 31 and the latter is connected to a selector switch 32. The selector switch 32 is connected to a seven-stage shift register 33 and is also connected via an AND network 36 to the conductor 87 (FIG. 6). The output of the shift register 33 is connected to one input of a correlator 83$S$ whose other input is connected to a shift register 34, also with seven stages, and whose output is connected via a conductor 150$d$ to the AND network 36 and the electronic control system 37. Two conductors 150$b$ and 150$c$ extend from the electronic control system 37 to an AND network 156 whose output supplies a first shift cycle for the shift registers 33 and 34. The said shift cycle preferably operates at the frequency of the sampling cycle $T_S$. The detector 30 is followed by a cycle regenerating stage 35 which supplies a second shift cycle for the shift register 33. The said shift cycle defines the speed of data input into the shift register 33 and is smaller than the first shift cycle $T_S$. The ratio between the two shift cycles is selected so that the data in the two shift registers may be circulated once with the shift cycle $T_S$ between the input of two successive bits into the shift register 33. Both shift registers 33 and 34 are provided with feedback.

The method of operation of the illustrated electronic evaluation system 15 is as follows: the signals fed by the reading means 24 (FIG. 5) via the conductor 83 into the electronic evaluation system are amplified in the amplifier 50 and are supplied to the threshold detector 25 in which "0" – "1" decisions are made. The signal is divided into samples at the sampling cycle $T_S$ (FIG. 10) in the downstream-connected sampling stage 26. The detector 30 detects the change between the two binary symbols and feeds the cycle pulses $T_S$ via the selector switch 29 either to the counter 27 or to the counter 28 depending on whether a "0" or a "1" was previously scanned. For example if scanning proceeds from left to right according to the example of FIG. 10, line $b$, there will first be 18 "0" samples, the selector switch 29 being in its upper position. This means that 18 cycle pulses are counted in the counter 27 ("0" counter). The data then changes to "1" and the selector switch 29 switches into its lower position whereupon the succeeding 12 samples "1" are counted in the counter 28. During the adjoining changeover from "1" to "0" a comparison is made in the comparator 31 between the position of the two counters. If the number of "1" samples in the counter 28 is less than the number of "0" samples in the counter 27, the switch 32 is moved to the left and the data bit is defined as "0." If the number of "1" samples on the other hand is greater than the number of "0" samples, the switch 32 will be set to the right and the data bit is defined as "1." Both counters are then reset to the zero counter position and counting begins anew for defining the next data bit. A sequence of data bits corresponding to the scanned article data will then appear at position E* practically independently of the speed at which reading or scanning proceeds. In order to define the beginning of the actual article data the pulse template method is used as described above. The data available at position E* is transferred to the shift register 33. The shift register 33 which may also be replaced by a read-only-memory, contains the stored pulse template. After the reception of each data bit, the contents of the two shift registers are circulated at the shift cycle T and the correlation value is defined in the correlator 835. If this correlation value is small a new data bit will be inserted into the shift register 33 and the correlation is repeated. If correlation yields a high value this indicates that the next bit will be the first bit of article data. The network 36 will be made conductive and parts of the electronic control system 37 which are not yet in operation will be rendered operative via the conductor 150d. The routine described in relation to FIG. 6 will then begin.

The scanning direction may be varied within wide limits with this kind of evaluation. For example, scanning may proceed along the line $AL_1$ or $AL_2$ FIG. 8 without affecting the result. Reading may also proceed at very different scanning rates, for example within the limits of 2 cm/s or 80 cm/s.

If optical systems are used for photoelectric scanning their depth of focus must not be too small. A parallel laser beam would of course be suitable for scanning but is too expensive for this application. The reading device may also employ optical fibres as scanning elements. The data support of the article should in all cases be in mechanical contact while traversing over the reading device. Possible erroneous readings due to incorrect operation however have only a slight significance because they are indicated by the signalling system and the reading operation may be repeated by the purchaser within seconds and as often as desired.

Instead of comprising only "0" or "1" binary symbols it is also possible for the scanned samples to comprise symbols of different amplitude stages, "white" being the maximum and "black" being the minimum amplitude and grey values indicating intermediate amplitudes between these two extreme values. This is important for on-line operation where the values obtained in photoelectric scanning are transmitted unchanged and continuously to the computer and only the computer decides whether a line is to be evaluated as "white" or "black."

Figure 12:
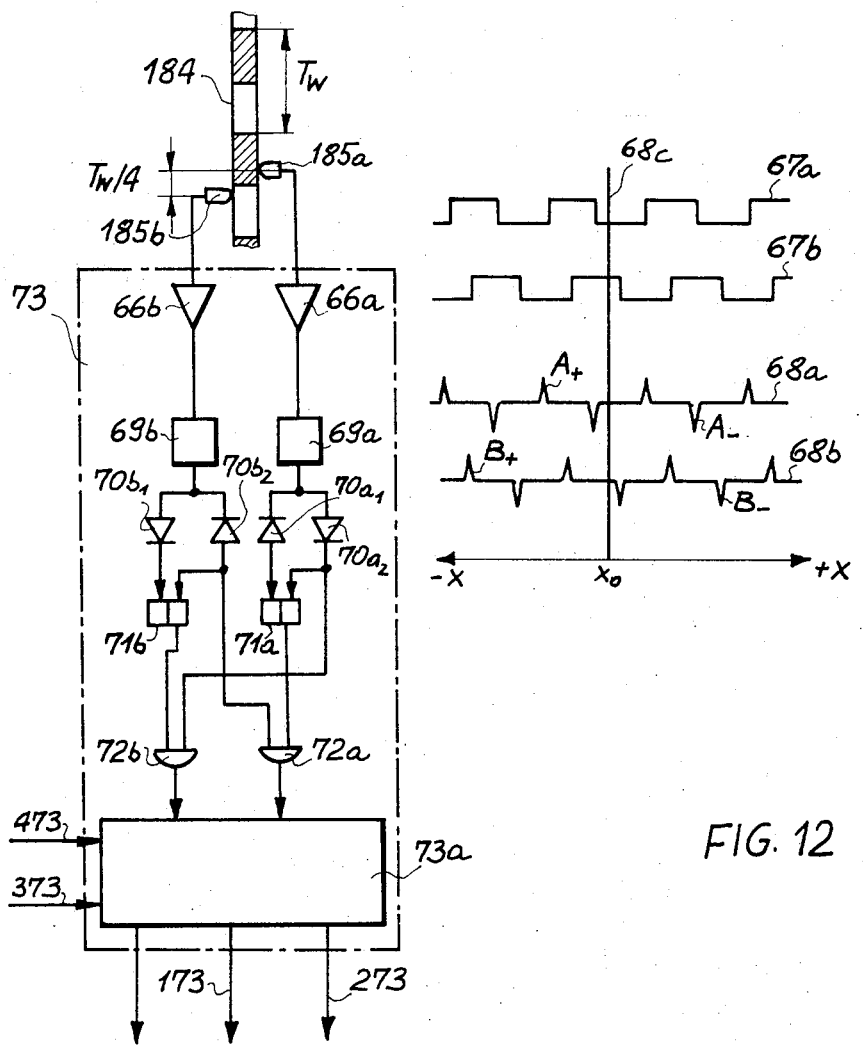
FIG. 12 is a circuit diagram of the scales counter and associated circuitry used in the electronic system illustrated in FIG. 6.

FIG. 12 shows part of the scales 182 and the scales counter 73 (FIG. 6) in diagrammatic form. The natural frequency of the scales amounts to approximately 3.5 Hz and the period to obtain a final weight within 0.1 percent amounts to approximately one-third seconds given optimum aperiodic damping. Since the scales do not have to measure the absolute weight of each article but only the increase in weight caused thereby it is possible for the scales to be relatively inexpensively constructed. Absolute stability of the scales spring with respect to time or a change of characteristics resulting from temperature and the like is practically of no significance. The only condition which must be satisfied is that the goods basket suspension has low friction. These conditions however are satisfied by relatively inexpensive kitchen scales so that this does not present any particular problem. Freedom from friction of the transmission of the suspended scales pan is also easily achieved because only very small forces are present and the pivoting points are not loaded by the goods placed into the scales. The scale 184 itself may for example comprise a polyester sheet of 5 cm diameter with 60 divisions applied by photographic means. Since only a change of weight and not the absolute weight is of importance this calls neither for scale encoding nor for any particular linearity requirements.

The accuracy to which the weight differences are measured need not be great, for example, an accuracy of ± 10 gf for a weight difference of 200 gf and an accuracy of ± 50 gf for a weight difference of 1 kgf is quite sufficient.

The scales counter 73, comprises a forward and reverse operating electronic binary counter 73a and an electronic circuit which is driven by one of two scanning heads 185a and 185b which scan the scale 184 to determine and retain an increase or decrease of weight of the goods basket. The two stationary scanning heads 185a and 185b are disposed at a distance from each other corresponding to a quarter of the length $T_W$ of a black and a white scale zone, that is to say at a distance of $T_W/4$. In the illustrated embodiment a downward motion of the scale 184 corresponds to an increase in weight and an upward motion to a decrease in weight. Motion of the scale produces pulse sequences 67a and 67b at the outputs of the two scanning heads 185a and 185b. These pulse sequences are amplified in amplifiers 66a and 66b and differentiated in differentiators 69a and 69b respectively. The two pulse sequences 68a and 68b are obtained as a result of differentiation, which produces pulse peaks $A_+$ and $A_-$ at the rise and decay times of the pulses in the pulse sequence 67a and pulse peaks $B_+$ and $B_-$ at the rise and decay times of the pulses in sequence 68b. These pulse peaks are evaluated to detect the forward or reverse motion of the scale.

The differentiators 69a, 69b supply the pulse sequences 68a and 68b to two sets of two rectifiers $70a_1$, $70a_2$ and $70b_1$, $70b_2$ respectively which are inversely connected with rspect to each other. The pulse peaks $B_+$ appear at the output of $70b_1$ and the pulse peaks $B_-$ appear at the output of $70b_2$. Similarly pulse peaks $A_-$ and $A_+$ appear at the output of the rectifiers $70a_1$ and $70a_2$ respectively. The outputs of the rectifier $70b_1$ and $70b_2$ are connected to a bistable multivibrator 71b, the pulse peaks $B_+$ setting the bistable multivibrator 71b in one position and the pulse peaks $B_-$ setting it into the other position, i.e. 0 or 1. The bistable multivibrator 71b is provided for forward counting. The outputs of the rectifiers $70a_1$ and $70a_2$ are similarly connected to a bistable multivibrator 71a for reverse counting, the last mentioned multivibrator being set by the pulse peaks $A_+$ and $A_-$. The outputs of the bistable multivibrators 71a and 71b together with the output of the rectifier 70b$_2$ (pulse peaks B$_-$) or the rectifier 70a$_2$ (pulse peaks A$_+$) are connected via AND networks 72a and 72b to the forward-reverse binary counter 73a. The two conductors 373 and 473 (FIG. 6) are connected to two further inputs of the binary counter 73a.

The method of operation of this part of the purchasing container electronic system is as follows: assuming that the polar co-ordinate X$_o$, reference line 68c is stationary relative to motion of the scale 184 in the $+x$ or $-x$ direction corresponding to unloading or loading the goods basket, loading the basket will move the scale 184 in the $-x$ direction past the reference line 68c. A pulse B$_-$ of the pulse sequences 68a and 68b first passes the reference line 68c. This pulse sets the bistable multivibrator 71b to "1." As the scale 184 continues to move, a pulse A$_+$ passes the line 68c which sets the bistable multivibrator 71a to "1" and triggers a forward count in the counter 73a via the AND network 72a. A pulse B$_+$ will then pass the reference line so that the bistable multivibrator 71b is reset to "0." This is followed by a pulse A$_-$ by means of which the bistable multivibrator 71a is reset to "0." If the scale 184 swings back into the $+x$ direction from the position then reached, the pulse A$_-$ will pass the reference line first, the pulse having immediately previously passed in the $-x$ direction. This does not result in any changeover of the bistable multivibrator 71a. A pulse B$_+$ will then pass the line 68c but the bistable multivibrator 71b will also not be reset and subsequently a pulse A$_+$ will pass which sets the bistable multivibrator 71a to "1." A pulse B$_-$ will then pass the line 68c so that the network 72a will be made conductive and reverse counting will be triggered. While the bistable multivibrator 71a is reset by an A$_-$ pulse before a reverse counting B$_-$ pulse arrives when the scale 184 moves in the $-x$ direction and reverse counting is thus suppressed, motion of the scale in the $+x$ direction causes forward counting to be suppressed due to the sequence of the pulses B$_-$ and B$_+$ prior to the appearance of a forward counting pulse A$_+$.

In addition to providing reliable forward-reverse counting this circuit also offers the advantage that to and fro swinging of the scale (for example due to being moved by hand while the article is placed into the pan) prevents erroneous counts being made due to the action of pulse hysteresis. The final number counted in the forward-reverse counter is therefore independent of whether it was achieved by a single motion towards the end point or by the inter-position of several intermediate swings.

Prior to each weighing operation of a new article the forward-reverse counter 73a is set to zero. The counter counts in the forward direction when weight increases and counts in the reverse direction when weight decreases. The counted number is evaluated only when the scales are at rest. This is achieved by the motion discriminator 74 (FIG. 6) which renders the AND network 75 conductive only when the motion has decayed. The motion discriminator responds if no A or B pulse has occurred, for example during a quarter second. The counter position defined in the counter 73a is transferred to the comparator 42 (FIG. 6) and is compared therein with the weight read off from the data support.

Instead of operating with mechanical scales the system may also be provided with electronic scales operating with strain gauges, the measured values of such scales being converted into digital form after being amplified by analogue-digital converters.

Figure 13:
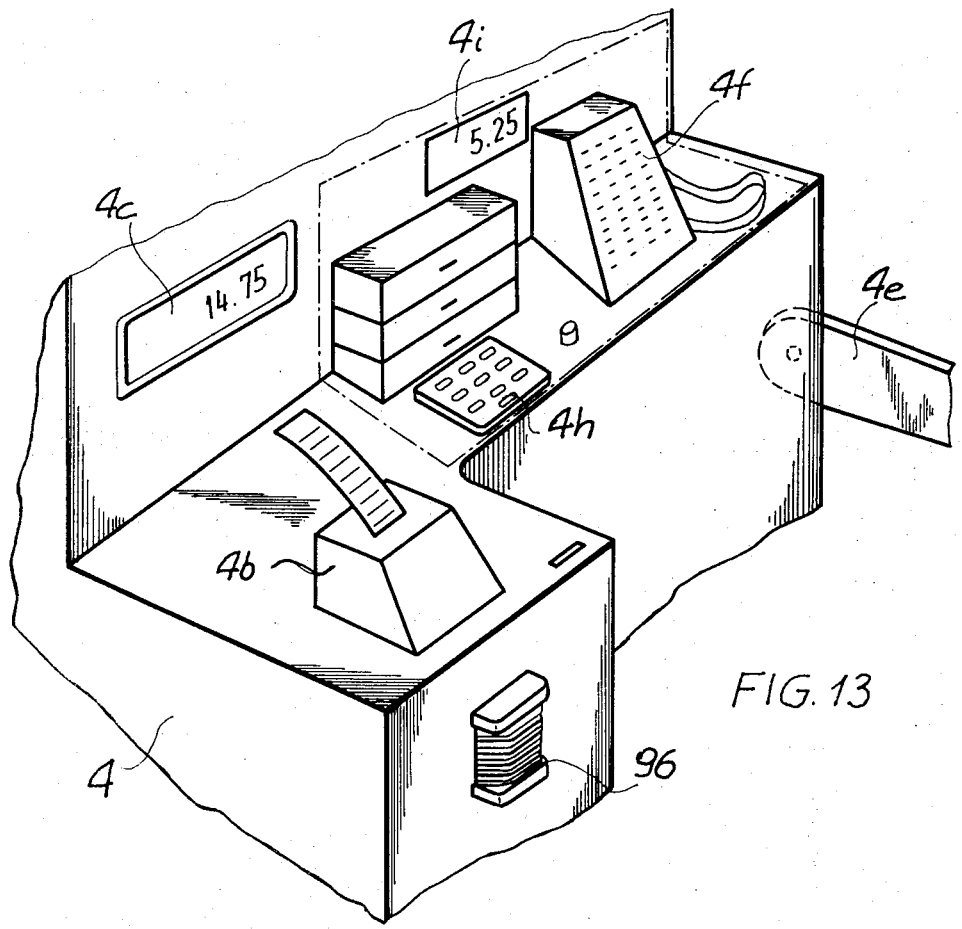
FIG. 13 shows the check-out station of the shop shown in FIG. 1.

FIG. 13 shows a check-out station 4 (FIG. 1) for off-line operation. According to the illustration the check-out station comprises a contact position 96 to which the appliance connector 95 of the purchasing trolley 2 (FIG. 5) may be connected, a panel 4c for indicating the amount to be paid by the customer, a high-speed cash register receipt printer 4b, a keyboard 4h, a panel 4i, for indicating the change to be returned to the customer, an automatic coin changer 4f and a barrier 4e.

As soon as the customer arrives with his trolley at the check-out station 4 contact between the appliance connector 95 on the trolley and the contact position 96 is automatically or manually established so that all article designations stored during the purchasing operation are transferred into the check-out station 4 or into the computer 93 associated therewith. The amount to be paid is computed and indicated on the panel 4c; according to the illustration an amount of 14.75 Fr is to be paid. The high-speed cash register receipt printer 4b simultaneously prints the cash register receipt at the rate of approximately 10 lines per second. If 20 articles have been purchased this means that the cash register receipt is printed out within 2 seconds. The cash register receipt may be torn off by the customer and retained by him. The customer hands to the shop assistant at the check-out station a corresponding sum of money, for example 20 Fr. This amount is keyed in by the keyboard 4h whereupon the change to be returned to the customer is indicated on the indicating panel 4i, in the illustration 5.25 Fr. This amount is delivered by the automatic coin changer 4f. A banknote compartment for the delivery of banknotes is also provided. The operator at the check-out station must key in the amount of money delivered by the customer, receive the amount of money and deliver any change which might be due. This procedure should not occupy more than 5 seconds and in practice corresponds to the time taken by a customer to pass through the check-out station. This time may be reduced still further if a fully automatic banknote and coin changer were to be used in place of the keyboard 4h, indicating panel 4i and coin changer 4f, elemants which are framed by a dash-dot line. The customer in this case could make payment by inserting a banknote in a slit and would automatically receive his change. The keyboard 4h and the operator become superfluous in this case. This would also be the case in cash-free transactions using credit cards. The operator (if present) opens the barrier 4e after payment has been made. This operation would take place automatically if no operator is present. The check-out station may have practically the same appearance for on-line operation only the contact position 96 would be omitted.

Figure 14:
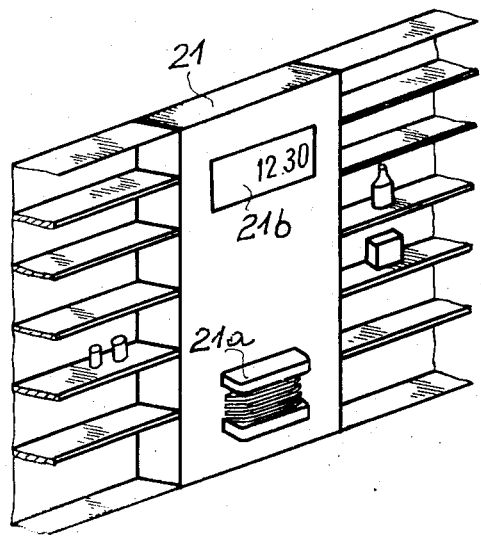
FIG. 14 shows a test station of the shop shown in FIG. 1.
Figure 16:
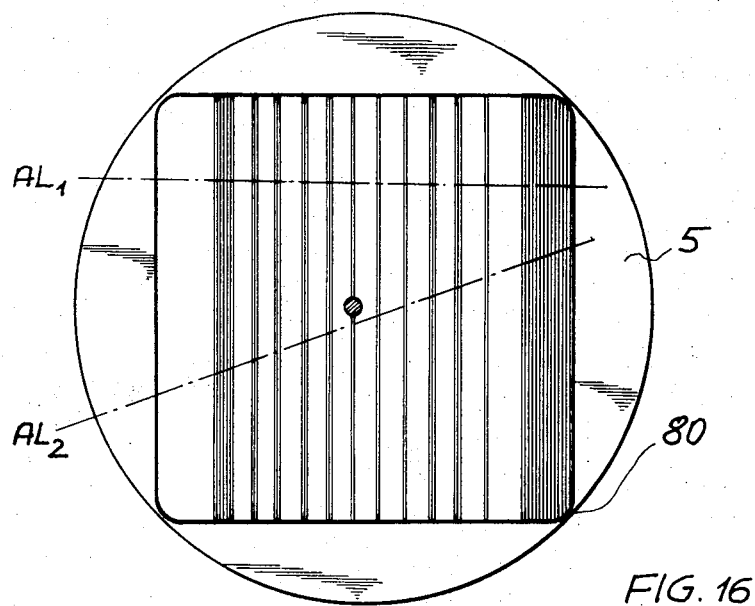
FIG. 16 is a view in the direction of the line XVI—XVI of FIG. 15, FIGS. 17 and 18 show different forms of data supports.
Figure 15:
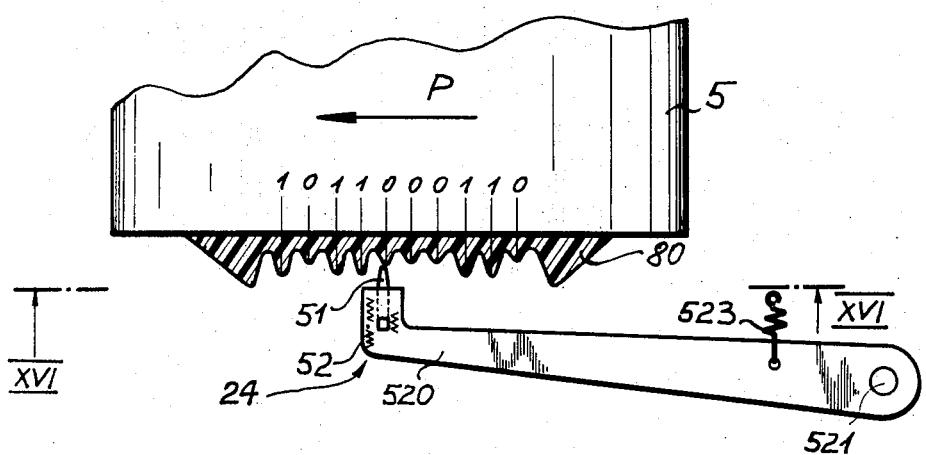
FIG. 15 is an enlarged view of a data support which may be mechanically scanned and of the associated scanner.

FIG. 14 shows a test station 21 (FIG. 1) in diagrammatic form. Test stations of this kind are used in off-line operation and are located in the purchasing room and enable the customer to obtain information regarding the total amount of the articles purchased so far during the operation. Testing stations 21 comprise a contact position 21a which corresponds to the contact position 96 (FIG. 13) and an indicating panel 21b. The article designations of the articles purchased so far are fed in at the contact position 21a by connection of connector 95 on the purchasing trolley 2 (FIG. 5) to the contact position 21a and the appropriate sub-total — Fr 12.30 in the illustration — is computed by means of the computer 93 (FIG. 1) which is associated with the test station and is indicated on the indicating panel 21b. The article number store 46 (FIG. 6) is of course not cancelled during this test. According to FIGS. 15 and 16, the data support 80 comprises a plastics plate with parallel longitudinal grooves and protuberances extending between the grooves. The data is contained in the height of the aforementioned protuberances. According to the illustration, the binary symbol "0" corresponds to a low height of the protuberances — shown in exaggerated form — and the binary symbol "1" corresponds to a large height. The reading means 24 in this case are mechanically constructed and substantially comprise an arm 520 which is supported so as to pivot about an axis 521, a scanning stylus 51 and a magneto mechanical or electro-mechanical transducer 52 of known kind being mounted in the aforementioned arm. A tension spring 523 acts on the arm 521 to thrust the latter together with the stylus against the data support 80. The article 5 or the data support 80 respectively is moved in the direction of the arrow P over the reading means 24 for the scanning operation. The scanning direction may vary within wide limits, it is merely necessary to be disposed at an angle to the protuberances. Scanning along the line $AL_2$ for example provides results which are just as good as those in the transverse direction — line $AL_1$. The scanning speed is of no consequence. The scanning cycle is unequivocally defined by the sequence of grooves and protuberances. Mechanical scanning is very reliable and provides good results even if the data support 80 has local damage because in this case there are still many alternatives for scanning.

Figure 17:
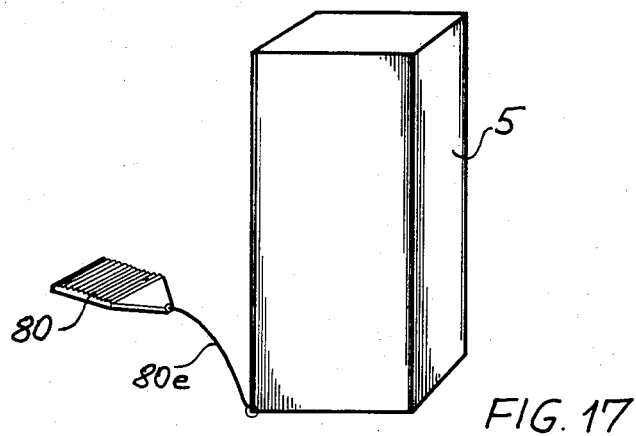

According to FIG. 17 the data support 80 which is provided with grooves and protuberances is joined to the article 5 by means of a semi-stiff plastics thread 80e.

Figure 18:
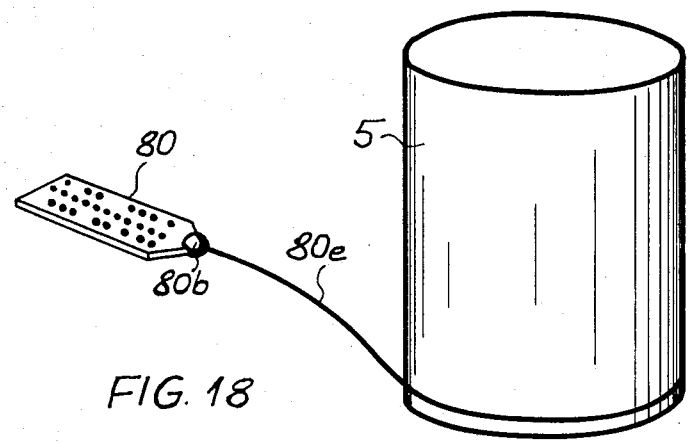

According to FIG. 18 the data support 80 takes the form of a plate constructed in the manner of a punched strip and is also connected to the article 5 by means of a semi-stiff plastics thread 80e. The data is disposed on the punched strip in three rows, on the left and right a data row and in the middle a cycle control track for unequivocal position co-ordination of the data elements. The cycle control track replaces any other synchronising means which might otherwise be required. A thickened portion 80b which simplifies manipulation during the reading operation is disposed between the plastics thread 80e and the data support 80.

Figure 19:
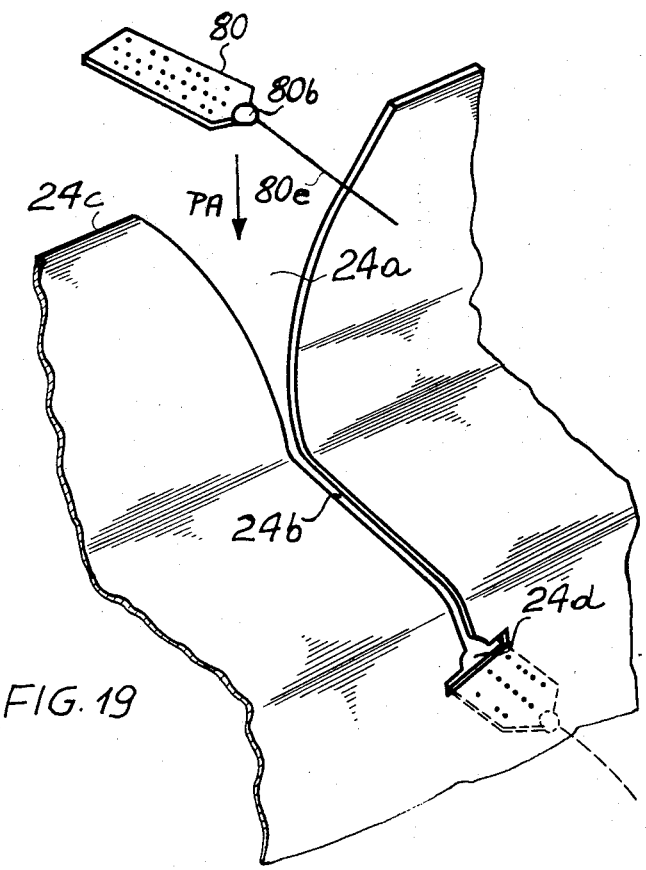
FIG. 19 shows part of a reading device for guiding data supports such as those shown in FIGS. 17 and 18 into the reading device.

According to FIG. 19 the reading means for reading data supports of the kind illustrated in FIGS. 17 and 18 is provided with a slotted guide wall 24c. At the upper end of its slot 24b the guide wall has a V-shaped catcher opening 24a and its lower end is provided with an exit opening 24d. The plastics thread 80e attached to the data support 80 is lowered in the direction of the arrow PA against the cathcer opening 24a and drawn downwardly in the slot 24b. At the same time the article 5 (FIG. 18) is drawn away from the guide wall 24c, the thickened portion 80b preventing the thread 80e being pulled out of the slit together with the data support. The actual reading means which scan the data support photo-electrically or mechanically when it is pulled out of the exit opening — the latter being large enough to permit unobstructed passage of the thickened portion under the action of the pull applied to it — is disposed directly at the exit opening 24d.

Figure 20:
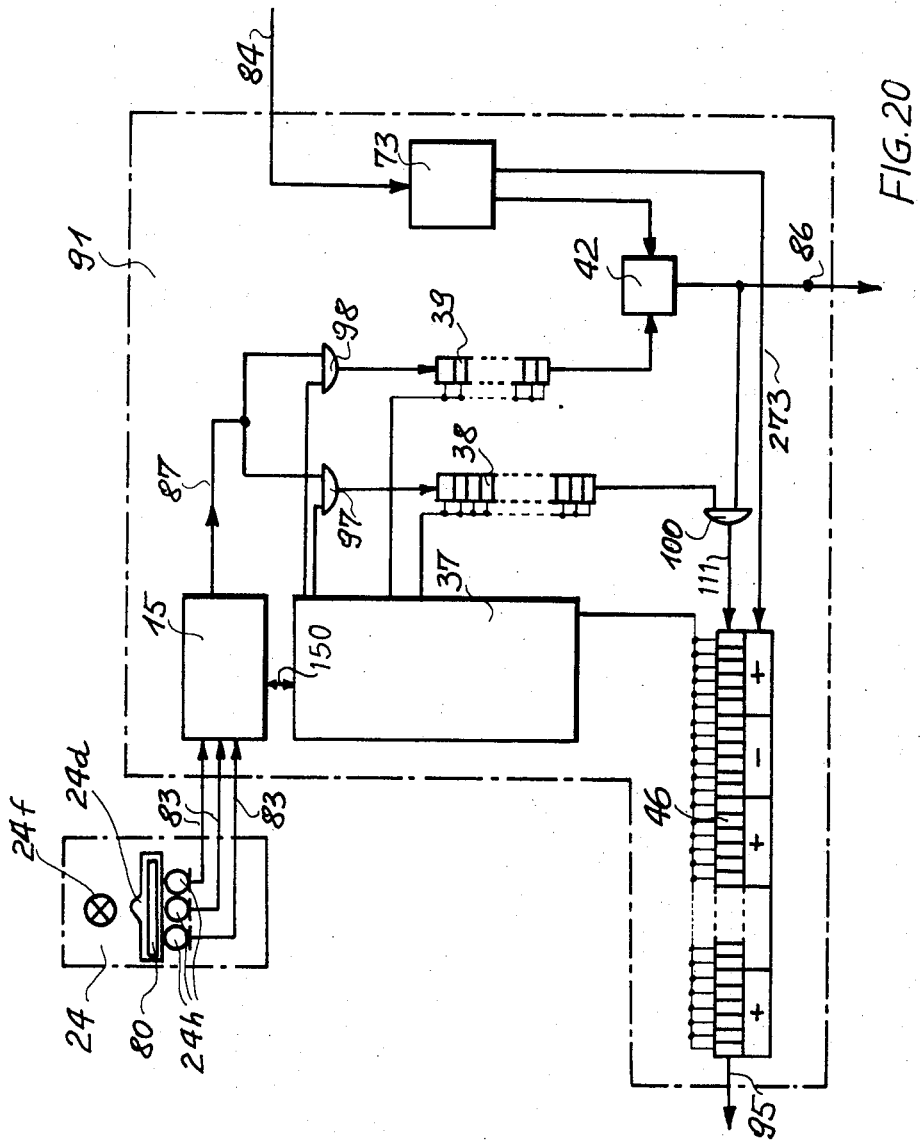
FIG. 20 is a first modification of the electronic system shown in FIG. 6 arranged for off-line operations.

FIG. 20 shows in diagrammatic form the purchasing container electronic system 91 (FIG. 5) of a purchasing trolley 2 (FIG. 5) arranged for off-line operation and shown as a block circuit diagram. The data support 80 utilised in this embodiment has the form illustrated in FIG. 18 and the reading means are as described with reference to FIG. 19. The data support 80 is disposed in the reading position, that is to say it is disposed in the exit opening 24d (FIG. 19). Each of the three tracks on the data support is associated with a different one of three photocells 24h in the reading means 24. Each photocell produces a signal when light emitted passes through the corresponding track on the data support from a light source 24f. The output of each photocell is connected to the electronic evaluation system 15 connected via the conductor 87 to the two AND networks 97 and 98 and via the conductor 150 to the electronic control system 37 in the same way as in FIG. 6. The electronic control system 37 and the two AND networks 97 and 98 divide the article data which has been read off into article designation and article weight, such data being fed into the intermediate shift register stores 38 and 39. The article weight defined in the scales counter 73 is compared in the comparator 42 with the article weight data stored in the shift register 39. If coincidence is obtained the article designation is fed via the AND network 100 into the article designation shift register store 46. The "+" or "−" marks associated with the individual article deisgnations are fed via the conductor 273 into the article designation store 46. A slightly modified circuit to that described above may also be employed in conjunction with mechanically scannable data supports 80 such as those illustrated in FIGS. 15 - 17.

FIGS. 21 to 24 show an embodiment of on-line operation between purchasing trolley and computer in which photoelectrically scannable data supports 80 are used on the articles. In this embodiment, the instantaneous values resulting from photo-electric scanning of the data supports are transferred to the computer in a fixed cycle raster which has a period $T_S$. The instantaneous values obtained from reading the weight scale are transferred with the same cycle raster to the computer. The cycle period must be shorter than the time taken to scan adjacent marks on a data support at the maximum attainable scanning speed. The cycle period $T_S$ may amount to 0.2 ms so that in each second every purchasing trolley is able to transmit 5,000 scanning values of the data support read-off and 5,000 scanning values of the weight scale read-off to the computer. Given 32 purchasing trolleys and two sets of data to be transmitted in one direction this would result in transmission rates of 320,000 scanning values per second in this example. The decision as to whether a scanning value of the data support is to be evaluated as "black" or "white" is made in the computer so that the scanning values which correspond to intermediate values (grey) are also transmitted to the computer. The scanning values may be transmitted by pulse code modulation or by pulse time or amplitude modulation.

Figure 21:
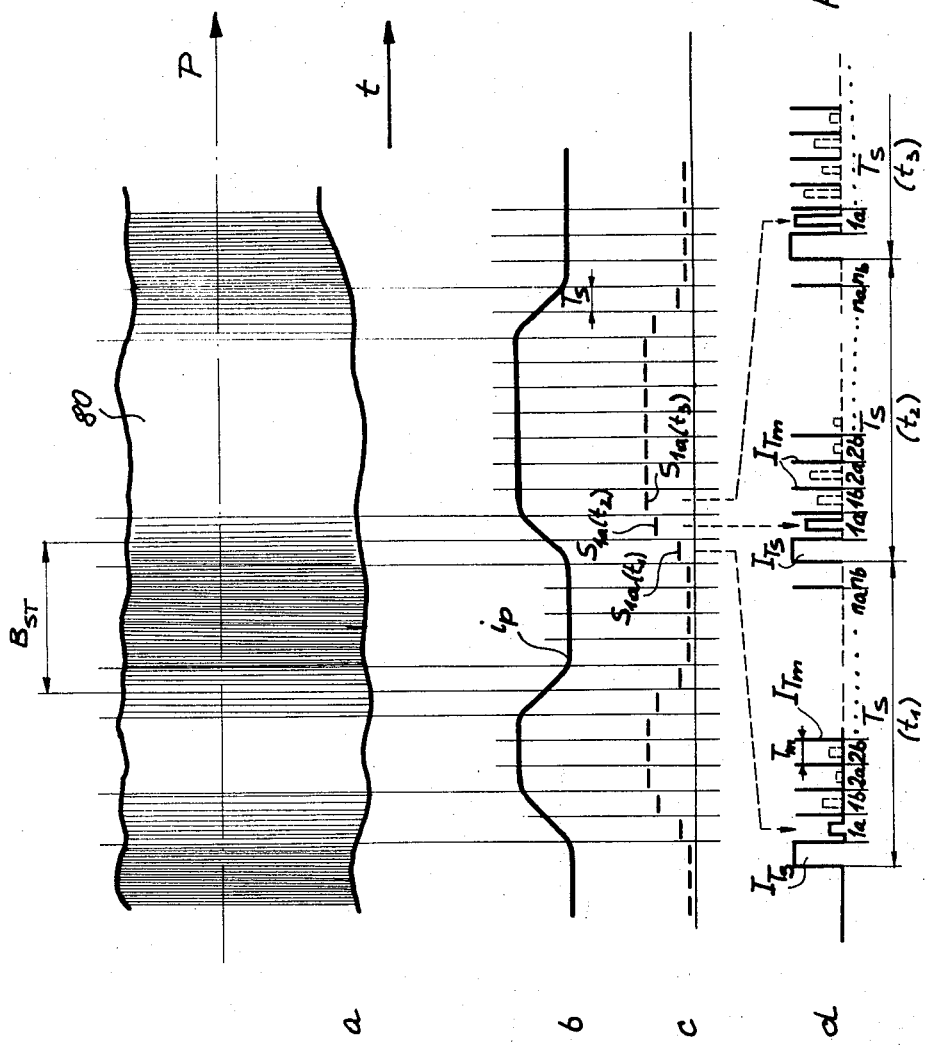
FIGS. 21 and 22 are waveforms produced by scanning a data support.

FIG. 21 shows at a an enlarged section of a data support 80 which is photo-electrically scanned in the direction of the arrow P. The width of the individual line marks which represent the data is designated $B_{ST}$. The photo electric current $i_p$ which is obtained in the reading means as a result of scanning is plotted in line b. The current $i_p$ is a maximum for white lines on the data support 80 and a minimum for black lines. The sampling cycle with the period $T_S$ divides the amplitude of the photo current $i_p$ into individual scanning values (line c). Some of these scanning values are designated $S_{1a(t1)}$, $S_{1a(t2)}$, $S_{1a(t3)}$. These scanning values correspond to the mean value or the integration of the area beneath the curve in a sampling section having a period $T_S$. Each scanning value is transmitted to the computer at the end of its sampling section. Radio transmission to the computer for example is performed by the synchronous time multiplex method (time sharing). The signal prior to high-frequency modulation to be transmitted is shown in line d to a time scale which is expanded relative to line c. The instantaneous scanning values produced by all the purchasing trolleys are transmitted sequentially within any one sampling cycle period $T_S$. Each of the n purchasing trolleys are associated with two time sections $T_m$, that is to say the sections 1a and 1b to the first purchasing trolley and the sections 2a and 2b to the second purchasing trolley and so on. To this end the sections 1a, 2a, 3a and so on are provided for the transmission of the scanning values of the data support and the sections 1b, 2b, 3b and so on are provided for the transmission of the scanning values of the weight scale. Using the time multiplex system the data from 32 purchasing trolleys may be transmitted to the computer over the same RF channel with 64 time sections $Tm$ per cycling period $T_S$. The time sections $Ts$ are divided into pulse rasters in the same way as for a television line signal with longer synchronising pulses $I_T$ at an interval of $T_S$ and shorter synchronising pulses $I_{Tm}$ at an interval of $Tm$. The data pulses (scanned values) 1a, 1b, 2a, 2b and so on are inserted between every two pulses $I_{Tm}$.

Figure 22:
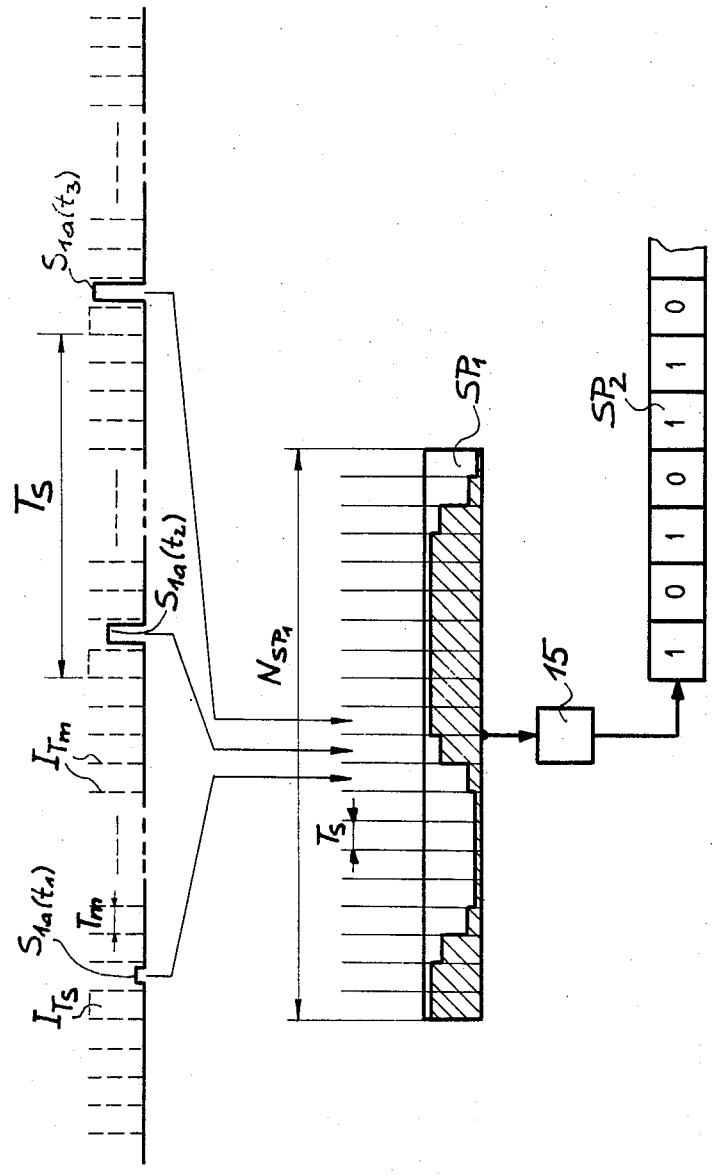

FIG. 22 shows in line a a simplified form of the signal illustrated in line d of FIG. 21 to be transmitted with the inserted scanning values $S_{1a(t1)}$.

$S_{1a(t2)}$ and $S_{1a(t3)}$ plotted thereon. The scanning values originating from each purchasing trolley are co-ordinated in the receiving section of the computer and associated with the appropriate purchasing trolley, the received valves being combined and stored in a store over the length of a section. T is process is shown in simplified form in line b of FIG. 22 which relates to scanning values $S_{1a(t1)}$, $S_{1a(t2)}$ and $S_{1a(t3)}$ which are transferred, for example, from the purchasing trolley No. 1; the said scanning values are stored for the section length $N_{SP1}$ in the store $SP_1$ which is associated with the purchasing trolley No. 1. The last mentioned section length is selected so that approximately 2 to 3 line widths $B_{ST}$ of the marks read off from the data support 80 (FIG. 21) may be stored within a section length even if the data support is read very slowly. Storage may be performed in digital-binary form, the amplitude values however may also be stored directly by means of a delay line. The binary values of the data on the data support 80 (FIG. 21) are evaluated by the electronic evaluation system 15 of the computer in a way similar to the method described with reference to FIGS. 8 to 11, such binary values being stored in a store $SP_2$. Since the scanning values appear in the form of amplitude values in the computer the electronic evaluation system 15 is able to define the threshold value to differentiate between the two binary symbols "0" and "1."

Figure 23:
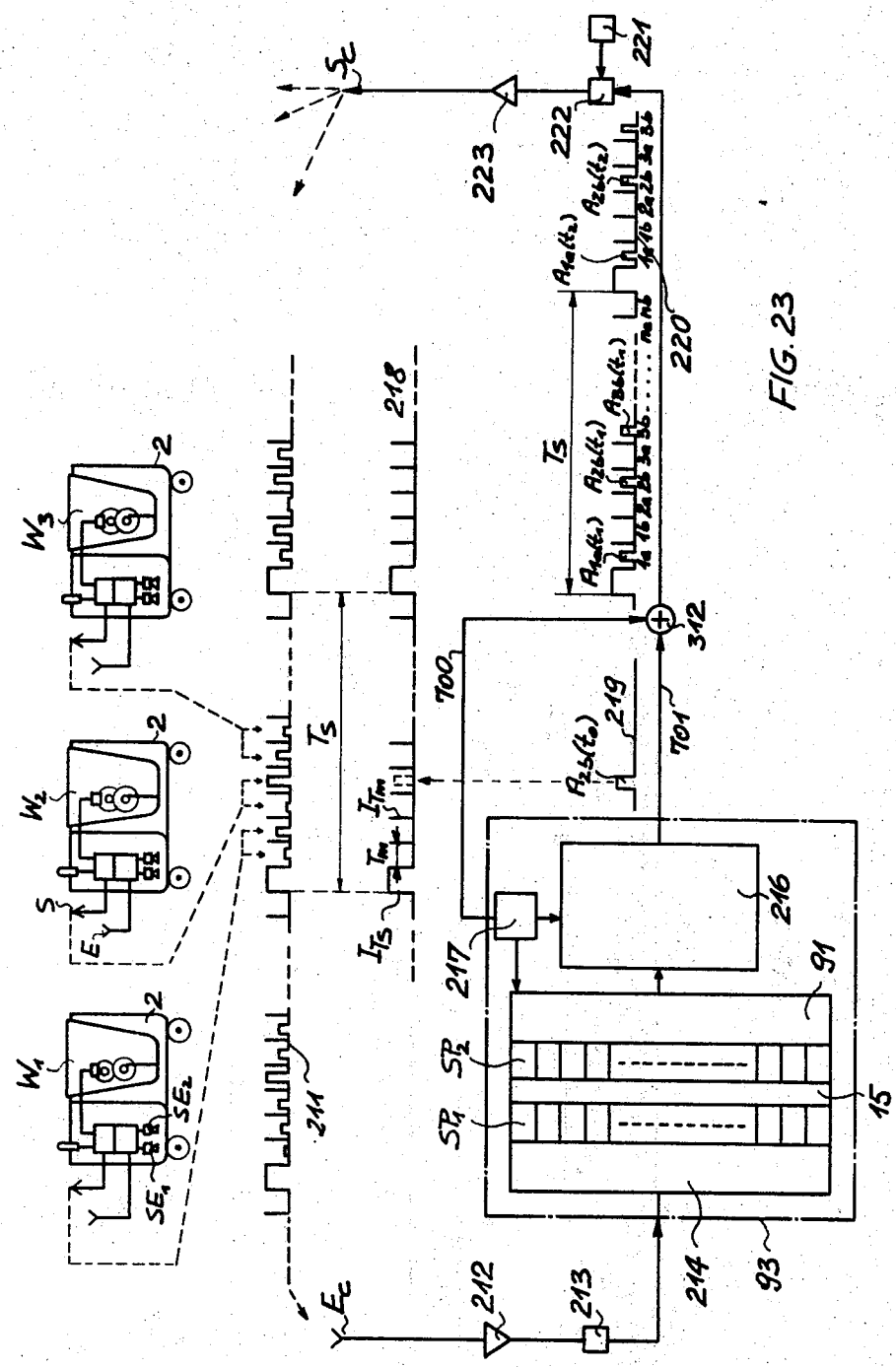
FIG. 23 shows trolleys and their associated electronic circuits in on-line operation.

FIG. 23 shows the co-operation between purchasing trolleys and computer in radio on-line operation in diagrammatic for m. Three of the 32 purchasing trolleys 2 are shown and designated $W_1$, $W_2$ and $W_3$. The transmitter output S of the trolleys transmits the signals obtained from scanning the data supports and the weight scale in the form of a time multiplex signal 211 over a single high-frequency channel, operating for example at a freuency of 30 MHz to a receiving aerial $E_c$, coupled to amplifier 212 feeding a demodulator 213 whose output is fed to the computer 93. In the computer the signals are distributed by a time multiplex demodulator 214 to stores $SP_1$ each of which is associated with a different one of the individual purchasing trolleys and then via the electronic evaluation system 15 to the store $SP_2$. The received evaluated data is then broken down in the electronic control system 91 into article weight data and article designation data which are stored during checking of the read-in data and the subsequent comparison of measured and read-off weights. These operations may also be performed in sequence for the different trolleys, that is to say by the time multiplex method. The cycle period in this case may be a 1,000 times as long as the cycle period $T_S$. Any errors detected in the course of these operations cause the transmission of an alarm signal at the cycle $T_s$ to the receiver input E of the purchasing trolley in question. The prices of the individual articles are stored in the main part 216 of the computer, the prices together with the article designations of the articles in a purchasing trolley permitting computation of the price which has to be paid. The main part 216 of the computer also acquires the sales data. The computer 93 is also provided with a cycle generator 217 which generates the earlier described signal with the long cycle pulses $I_T$ (period $T_S$) and the short cycle pulses $I_{Tm}$ (period $Tm$) and applies the pulse sequence 218 over conductor 700, to a mixer 312 to which is fed alarm signals A(pulse signals 219) over conductor 701, the mixer 312 inserting the pulse signals 219 into the pulse train 218. The resultant pulse train is designated 220 and is transmitted via a modulator 222, an amplifier 223 and a transmitter output $S_c$ to the purchasing trolleys. To this end a common transmitting frequency, for example 29 MHz is used for all purchasing trolleys, the transmitting frequency being generated by an oscillator 221. The alarm trigger signals $A_{1a(t1)}$ and $A_{1a(t2)}$ are generated in the computer by faulty reading of a data support in the purchasing trolley $W_1$ and, depending on their position in the time raster $T_S$, trigger the signalling system $SE_1$ in the purchasing trolley $W_1$. The larm trigger signal $A_{2b(t1)}$ and $A_{2b(t2)}$ are produced in the computer by non-coincidence of measured and read-off weight in the trolley $W_2$ and initiate operation of the signalling system $SE_2$.

Figure 24:
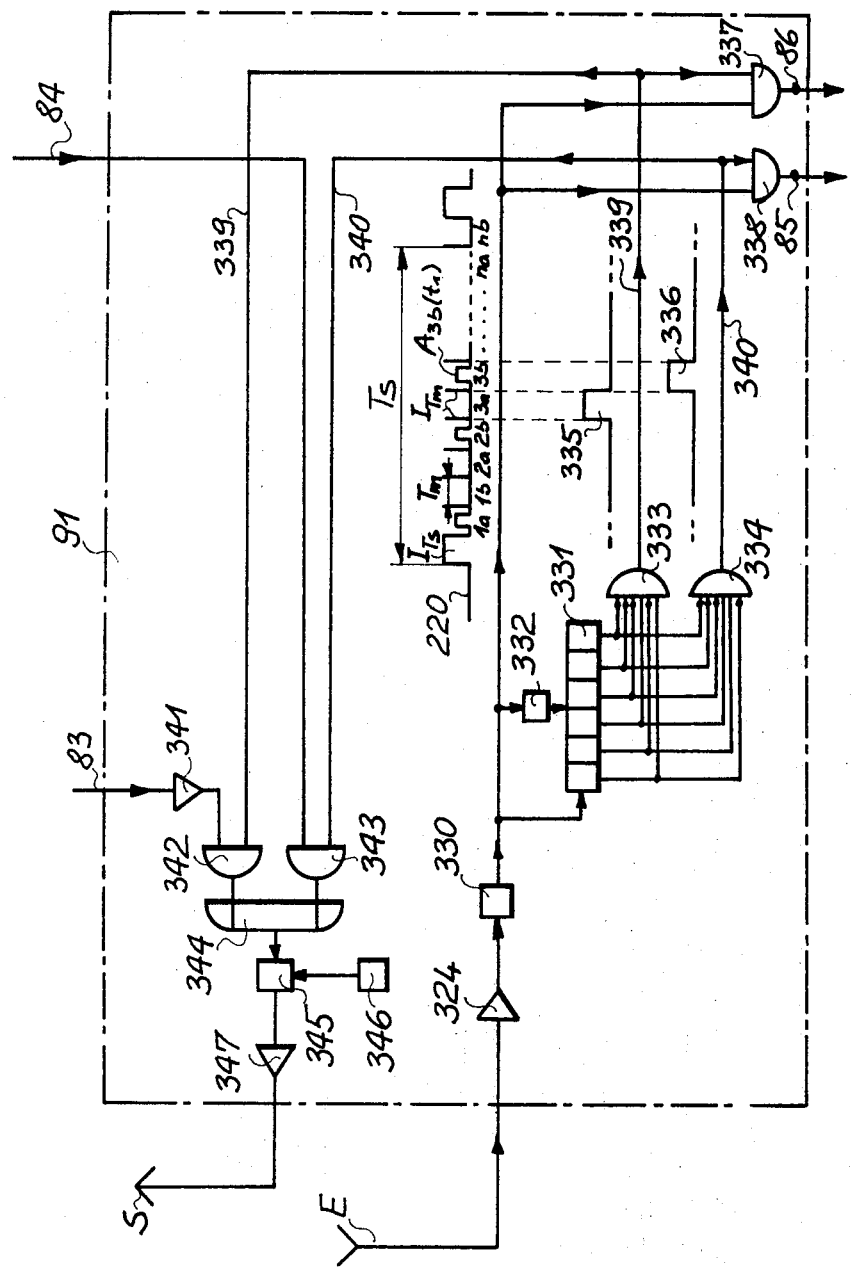
FIG. 24 is a variation of the electronic system of FIG. 6, FIGS. 25 to 29 show further embodiments of a data support, FIG. 26 also showing mechanical sensing of data.

FIG. 24 shows the purchasing container electronic system 91 of a purchasing trolley arranged for on-line operation in the form of a block diagram. The pulse train 220 transmitted in modulated form by the computer 93 is received via the receiver input E and passed via an amplifier 329 to a demodulator 330. The pulse train 220 having the cycling pulse raster $I_T$, $I_{Tm}$ and the alarm trigger signals, for example the signal $A_{3b(t1)}$ appears at the output of the demodulator 330 and is passed on to a binary counter 331. The binary counter 331 has six stages for 32 purchasing trolleys. Since it is necessary for two separate sets of data to be transmitted to and from the trolleys it follows that the period $T_S$ comprises 64 part sections $T_m$. A reset circuit 332, associated with the output of the demodulator 330, responds to the long pulses $I_{TS}$ and sets the binary counter 331 to zero when such a pulse occurs. When this has taken place the binary counter operates at the frequency corresponding to the cycle period $I_{T_m}$ and after 64 timing pulses reaches the next zero setting. The individual stages of the binary counter 331 are connected by decoding circuits comprising AND networks 333 and 334, a so-called "time pass window" 335 or 336 respectively appearing at the outputs of the decoding circuits during counting of the counter. The position of the "time windows" with respect to time depends on the kind of decoding circuit and differs from purchasing trolley to purchasing trolley. In the illustrated example the decoding circuit 333 provides a time window during the fifth data interval — $3a$ — and the decoding circuit 334 provides a time window during the sixth scale interval — $3b$ — where both intervals are, for example, associated with the purchasing trolley $W_3$. Each of the three trolleys has two time windows within the period $T_S$, the position of the windows being fixed relative to time by the decoding circuits which are individual to the trolleys. The last alarm signal of the alarm signals $A_{1a(t1)}$, $A_{2b(t1)}$ and $A_{3b(t1)}$ which are present in the pulse train 220 is selected in the trolley $W_3$ and supplied via an AND network 337 to the signalling system $SE_2$. The alarm signal $A_{1a(t)}$ and $A_{2b(t1)}$ on the other hand are not selected in the trolley $W_3$.

In addition to the function described hereinabove, the time windows 335 and 336 also fulfil a second function, they define the moments in time during which the scanning values are transmitted by the purchasing trolley to the computer. These transmissions therefore take place in sequence and may be unequivocally associated with the individual purchasing trolleys in accordance with the position of the time windows.

Data read-off by the reading means 24 from the data supports 80 (FIG. 21) passes via the conductor 83 to an amplifier 341 and from there to an AND network 342. The latter, controlled by the decoding circuit 333 via the conductor 339 passes a scanning value occurring in the time window 335 to an OR network 344. The data read off from the weight scale passes via the conductor 84 to an AND network 343 which is controlled by the decoding circuit 334 via conductor 340 and passes a scanning value occurring in the time window 336 to the OR network 344. The scanning values which are then correctly positioned in the time multiplex raster are passed to a modulator 345, which modulates a carrier wave generated by an oscillator 346 with the scanning values and passes the modulated carrier wave to an amplifier 347 and thence to the transmitter output S from which they are transmitted by radio to the computer.

Since all purchasing trolleys are in constant communication with the computer, a simple price indicating panel in the purchasing trolley is able to indicate the total price of goods which have been purchased so far thus dispensing with the need for special test stations. The signalling systems may be connected to blocking means which prevent continued use of the trolley by, for example locking the wheels of the purchasing trolley or preventing goods being put into the basket by providing a closure member for the top of the basket 18.

Figure 27:
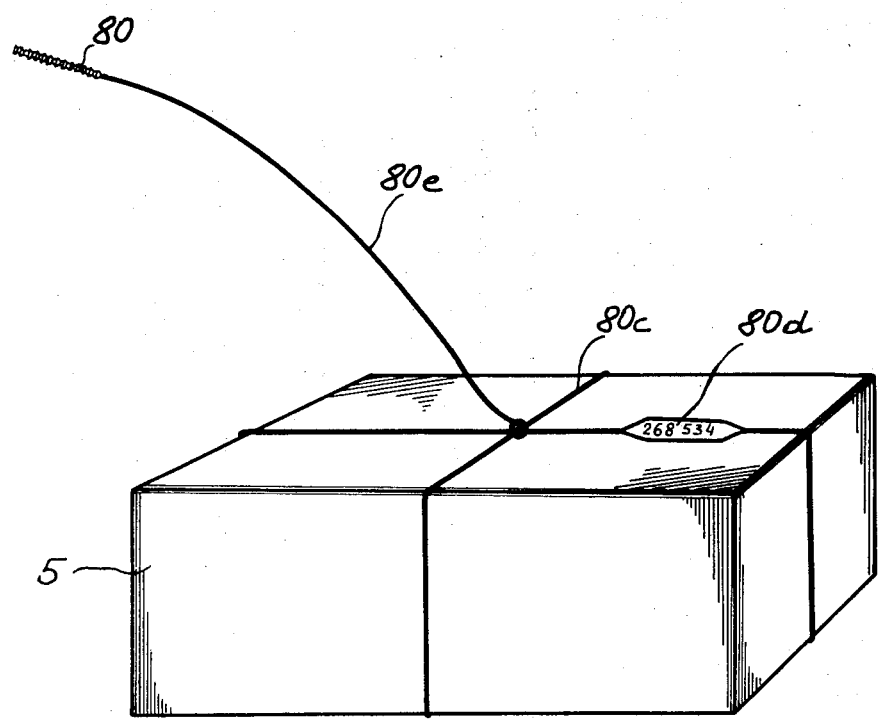
Figure 25:
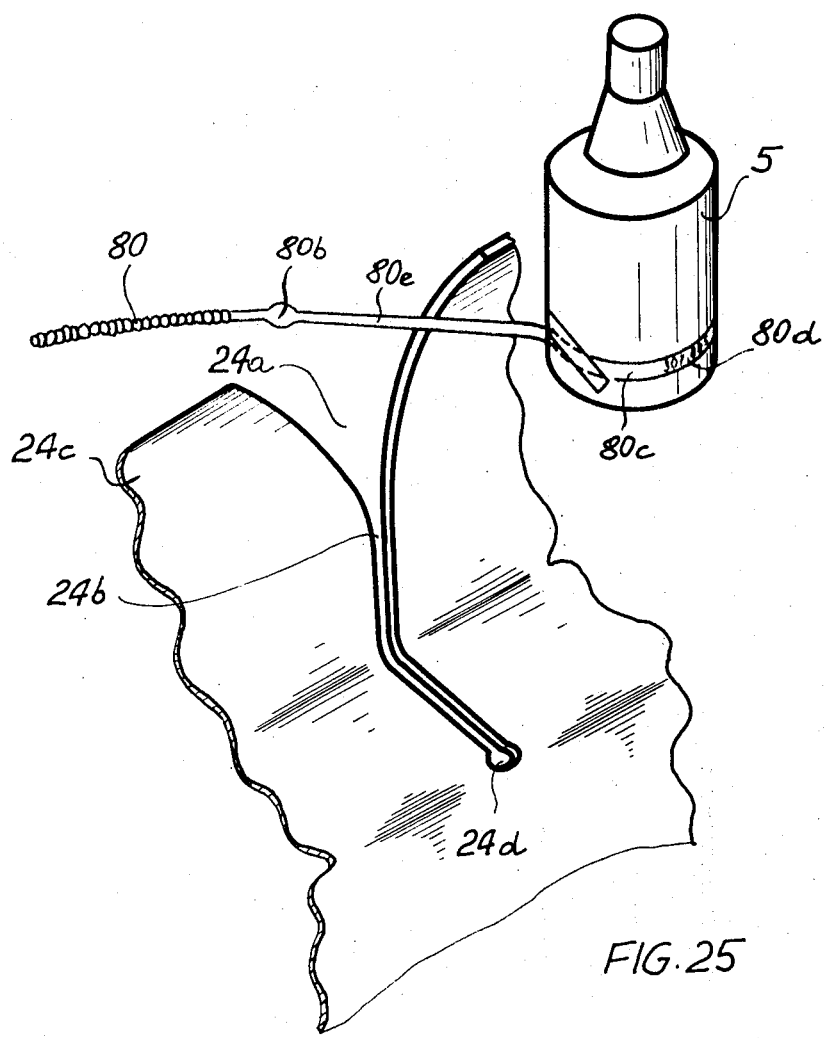

FIGS. 25 to 27 show a particularly advantageous embodiment of the data support 80. This data support substantially comprises a plastics filament provided with beads and grooves.

As shown in FIG. 25 the data support 80 constructed from a plastics filament is mounted on an article 5 by means of a connecting member 80e. The data support and connecting member are preferably integral and are of circular cross-section. The diameter of the connecting member 80e amounts to approximately 1mm. At the end adjoining the data support 80 the connecting member 80e is provided with a thickened guide portion 80b and at its other end it merges into a strip-shaped adhesive part 80c which is adhesively affixed to the article 5. The strip-shaped part 80c is provided with a zone 80d on which the article designation is embossed or printed in the form of a number. This ensures that the article designation remains on the article even if the plastics filament is torn off. The illustrated part of the reading means is constructed in a similar fashion to that described with reference to FIG. 19 and will therefore not be described in this context.

FIG. 26 shows the data support 80 of FIG. 25 with an associated scanner in enlarged form. The data contained on the data support 80 is applied thereto in the form of beads of different diameter which are separated from each other by grooves. Beads with a large diameter, for example 1.6 mm, may represent the binary symbol "1" and beads of small diameter, for example 1.2 mm, may represent the binary symbol "0." The data support 80 is mechanically scanned by two scanning arms 24e and 24f which are held against the data support by a tension spring 24h, the arms being supported in bearings 24k and 24m and joined by a link 24i. The scanner is fixed in a stationary position relative to the slotted guide plate 24c (FIG. 25, 19). For the scanning operation the data support 80 is pulled by the customer through the scanning device in the direction of the arrow P (FIG. 26). The contours of the beads are made sinusoid as far as possible so that excessive acceleration of the arms are avoided during scanning. If the filament diameter amounts to 0.8 mm for example, and the diameter of a large bead representing the binary symbol "1" amounts to 1.6 mm for example, the radius difference will be 0.4 mm and the amplitude of the sinusoidal scanning motion of each scanning arm amounts to 0.2 mm. If the distance Lp between two adjacent beads is 2 mm and if the customer pulls the filament at a speed of 1 $m/s$ through the scanner the time interval between scanning two adjacent beads will be equal to 2 ms and the scanning frequency will be equal to 500 Hz. This provides a maximum acceleration of the scanning arms of approximately 200 g (where g = gravitational acceleration). If the weight of the scanning arms amounts to approximately 0.5 gf the maximum possible acceleration forces will be equal to 100 gf so that a spring force of 200 gf is sufficient for the spring 24h.

Movement of the scanning arms may be detected photo-electrically by a diaphragm 24g depending from the arm 24f and interrupting a light beam emitted by a light source. The time at which data is evaluated is defined as the time of maximum deflection of the scanning arms, that is to say when the arms are moving towards each other along the trailing flanks of the sinusoidally shaped beads.

As shown in FIG. 27, the data support 80 may also form part of a packaging cord 80c. This kind of data support, manufacture of which is relatively inexpensive, has the following advantages;

The reading operation is rendered exceptionally simple since automatic positioning of the data supports in the reading means can be accomplished.

The filament-shaped data support is sufficiently inconspicuous not to obscure any matter printed on the article but can be easily found by the customer for inserting the data support into the reading means.

The circular cross-section of the data support allows rotation of the filament about its longitudinal axis.

The filament is sufficiently stiff to enable it to be inserted into the reading means but not so stiff as to interfere with stacking of the goods.

The filament may be tensioned without breaking it.

Mechanical scanning is very reliable so that a single additional parity bit is sufficient for error recognition.

The electronic evaluation system for this form of data support can be made very simple.

For large objects the connecting member 80e can be made sufficiently long so that the articles need not be moved for reading the data on the data support.

The data supports are suitable for all kinds of articles.

The data support for goods which are priced according to their weight and which are weighed on request by the customer comprises two parts, namely the article designation and the article weight. The last mentioned part is prefabricated and is neatly grouped in accordance with weight which is determined at a weighing station. The two parts may be assembled for example by welding together of the plastics filaments. Article price computation by the computer in this case takes place on the basis of article designation and article weight.

Figure 28:
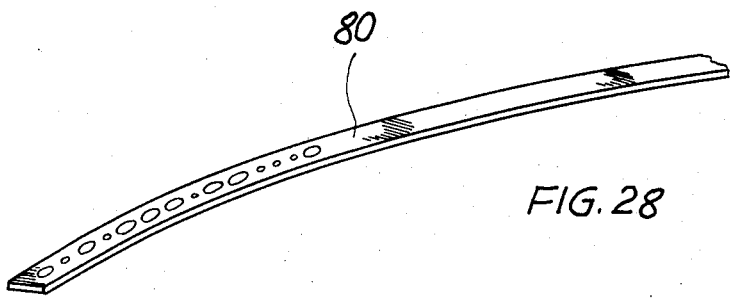
Figure 29:
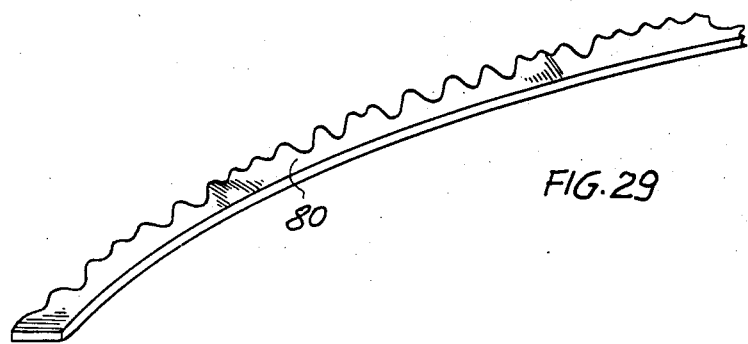
Figure 30:
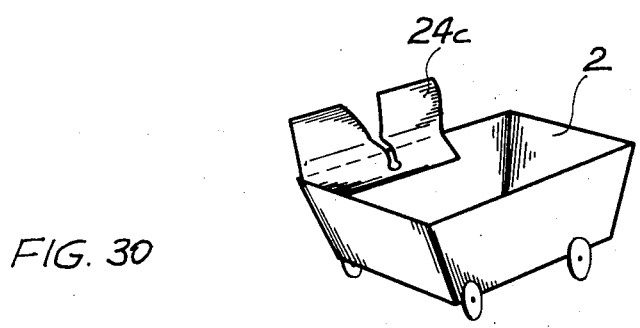
FIG. 30 shows a trolley with the guiding device of FIG. 19 attached thereto.

FIGS. 28 and 29 show two further embodiments of mechanically scannable data supports 80. In FIG. 28, the binary symbol "0" is represented by a small aperture and and the binary symbol "1" is represented by a large aperture. In FIG. 29 the binary symbol "0" is represented by a small notch and the binary symbol "1" by a large notch. All data supports illustrated in FIGS. 25 to 29 may of course also be directly scanned by photo-electric means.

The guide plate 24c as shown in FIGS. 19 and 25 of the reading means 24 is shown mounted on a purchasing trolley 2 in FIG. 31.

The purchasing container need not necessarily be a trolley, it could be a basket with a built-in scales, reading and signalling systems. A basket of this kind would have to be placed on a flat base, for example on the floor, when goods are put into the basket.

I claim:

1. Equipment for facilitating purchase of articles from a self-service shop wherein the articles are provided with machine readable identifying data and wherein the shop is provided with a check-out station having a computer associated therewith, which comprises purchase trolleys each of which includes a container for holding articles placed therein by a customer during the purchasing operation, a device for reading the identifying data associated with each article placed in or removed from said container and weighing means correlated with said container indicating an increase or decrease in weight resulting from placing an article in or removing it from said container;

and said equipment further including a first electronic circuit responsive to said reading device and said weighing means to indicate if the data has been read correctly but an article has not been placed in or removed from said container and to indicate if an article has been placed in or removed from said container but the data has not been read correctly.

2. Equipment according to claim 1, wherein the data include article weight data, and said equipment further includes an intermediate weight store for storing the article weight data read by said reading means and said first electronic circuit includes a comparator comparing the article weight data stored in the intermediate weight store with the weight indication produced by said weighing means to provide said indications.

3. Equipment according to claim 2, wherein said identifying data includes data designating the article with which the identifying data is associated, said equipment further including an intermediate article designation store for storing said article designating data read by the reading device, an article designation store, and means for transferring the article designating data from the intermediate article designation store into the article designation store when said comparator detects coincidence between the article weight data stored in said intermediate weight store and the article weight indication produced by said weighing means.

4. Equipment according to claim 3, wherein the article identifying data includes a check code and said equipment further includes an error recognition device coupled to said reading device to check if the identifying data has been read correctly, a signalling system having a first stage responsive to said error recognition device detecting an incorrect reading of said identifying data to produce a first alarm signal and a second stage responsive to the comparator detecting that the difference between the article weight data applied thereto and the indication produced by said weighing means exceeds a predetermined value to produce a second alarm signal.

5. Equipment according to claim 2, wherein said weighing means includes a scale having alternate lines of different densities, means coupling the scale to said container and movable therewith through a distance representing the weight of an article placed in or removed from said container, photo-electric means for scanning said lines as they move through said distance to produce signals representing the article weight, a bi-directional electronic scales counter coupled to said comparator, means for transferring said signals from said photo-electric means to said scales counter, means for setting the scales counter to zero after each article is placed in or removed from said container so that the count produced by the signals from said photo-electric means indicates the article weight after the article is placed in or removed from the container.

6. Equipment according to claim 5, wherein said photo-electric means includes photo detectors mounted at a distance from each other corresponding to one-fourth of the period of the scale lines so that the motion of the scale in one direction corresponds to an increase in weight of said container, and motion in a direction opposite to said one direction corresponds to a reduction in weight of said container, the scales counter being adapted to produce a sign signal representing motion of said scale in said one direction and a sign signal representing motion in said opposite direction.

7. Equipment according to claim 6, wherein said weighing means further includes a motion detector coupled to the scales counter for detecting when an article is placed in or removed from said container and triggering the operation of the compartor to compare the article weight stored in the intermediate weight store with the count in the counter when the container is substantially at rest.

8. Equipment according to claim 2, including a monitoring weight, means for loading the container of a purchase trolley with the monitoring weight, means for applying a signal representing the monitoring weight to the comparator, and means for triggering the operation of the comparator to compare the signal representing the monitoring weight with the indication produced by said weighing means for automatically checking the operation of the weighing means.

9. Equipment according to claim 3 and wherein each said purchase trolley includes an appliance connector for connecting said intermediate article designation store, said comparator, said article designation store and said intermediate weight store to said check-out station.

10. Equipment according to claim 1 wherein each said purchase trolley includes radio transmission means coupled to said reading device and said weighing means to transmit the indications provided by said weighing means and the data read by said reading device, and wherein said check-out station includes a radio receiver for receiving the transmissions from said radio transmission means, said first electronic circuit being located at said check-out station and coupled to said receiver to provide said indications produced by said first electronic circuit.

11. Equipment according to claim 3 wherein each said purchase trolley includes radio transmission means coupled to said reading device and said weighing means to transmit the indications provided by said weighing means and the data read by said reading device; and wherein said check-out station includes a radio receiver for receiving the transmissions of said transmission means, said check-out station including, the article designation store, the intermediate weight store and the comparator operable by the data read by said reading device and the indications provided by said weighing means received by said receiver from the transmission means.

12. Equipment according to claim 11, wherein said article identifying data includes a check code, said check-out station further including an error recognition device coupled to said radio receiver and comprising a signalling system having a first stage responsive to said error recognition device detecting an incorrect reading of said identifying data transmitted from said transmission means to the radio receiver to produce a first alarm signal, and a second stage responsive to the comparator detecting that the difference between teh article weight data applied thereto and the indication produced by said weighing means, both transmitted from the transmission means to the radio receiver, exceeds a predetermined value to produce a second alarm signal.

13. Equipment according to claim 12 wherein each said purchase trolley includes a second radio receiver, first and second alarm means coupled to said second radio receiver and said check-out station includes a second transmission means, means for applying said first and second alarm signals to said second transmission means for transmission to the second radio receiver to operate said first and second alarm means respectively.

14. Equipment according to claim 12 including time multiplexing means controlling the transmission of data from the purchase trolleys to the check-out station.

15. A trolley having a scale pan, into which articles may be placed or from which articles may be removed, weighing means coupled to said scale pan to indicate an increase or decrease in weight as an article is placed on or removed from said scale pan, a reading device for reading data on an article to be placed or removed from said pan, said data including data relating to the type of article and the weight of the article, and electronic means responsive to said reading device and said weighing means to indicate if the data has been read correctly but an article has not been placed in or removed from said pan and to indicate if an article has been placed in or removed from said pan but the data has not been read correctly.

16 Equipment for facilitating purchase of articles from a self-service shop wherein the articles are provided with machine readable identifying data and wherein the shop is provided with a check-out station having a computer associated therewith, which comprises purchase trolleys each of which includes a container for holding articles placed therein by a customer during the purchasing operation, a device for reading the identifying data associated with each article placed in or removed from said container, said identifying data including a check code, article designating data and article weight data, and weighing means correlated with said container indicating an increase or decrease in weight resulting from placing an article in or removing it from said container, and said equipment further including an electronic circuit which comprises an intermediate weight store for storing the article weight data read by said reading device, a comparator comparing the article weight data stored in the intermediate weight store with the weight indication produced by said weighing means, an intermediate article designation store for storing said article designating data read by said reading device, an article designation store, means for transferring the article designating data from said intermediate article designation store into said article designation store when said comparator detects coincidence between the article weight data stored in said intermediate weight store and the article weight indication produced by said weighing means, an error recognition device coupled to said reading device to check if the identifying data has been read correctly, and a signalling system having a first stage responsive to said error recognition device detecting an incorrect reading of said identifying data to produce a first alarm signal and a second stage responsive to said comparator detecting that the difference between the article weight data applied thereto and the indication produced by said weighing means exceeds a predetermined value to produce a second alarm signal.

* * * * *